(12) United States Patent
Delavaux et al.

(10) Patent No.: US 11,509,110 B2
(45) Date of Patent: Nov. 22, 2022

(54) BROADBAND HO-DOPED OPTICAL FIBER AMPLIFIER

(71) Applicant: Cybel, LLC., Bethlehem, PA (US)

(72) Inventors: Jean-Marc Delavaux, Pittstown, NJ (US); Robert E. Tench, Allentown, PA (US); Alexandre Amavigan, Whitehall, PA (US)

(73) Assignee: Cybel, LLC., Bethlehem, PA (US)

(*) Notice: Subject to any disclaimer, the term of this patent is extended or adjusted under 35 U.S.C. 154(b) by 314 days.

(21) Appl. No.: 16/849,182

(22) Filed: Apr. 15, 2020

(65) Prior Publication Data

US 2021/0328400 A1  Oct. 21, 2021

(51) Int. Cl.
| | | |
|---|---|---|
| H01S 3/067 | (2006.01) | |
| H01S 3/16 | (2006.01) | |
| H01S 3/0941 | (2006.01) | |
| H01S 3/094 | (2006.01) | |

(52) U.S. Cl.
CPC ........ *H01S 3/06762* (2013.01); *H01S 3/0675* (2013.01); *H01S 3/06716* (2013.01); *H01S 3/0941* (2013.01); *H01S 3/09415* (2013.01); *H01S 3/094038* (2013.01); *H01S 3/094042* (2013.01); *H01S 3/161* (2013.01); *H01S 3/1608* (2013.01); *H01S 3/1616* (2013.01); *H01S 3/1618* (2013.01)

(58) Field of Classification Search
CPC ................................................ H01S 3/094061
See application file for complete search history.

(56) References Cited

U.S. PATENT DOCUMENTS

| | | | |
|---|---|---|---|
| 6,583,927 B2 | 6/2003 | Choi et al. | |
| 6,853,480 B2 | 2/2005 | Choi et al. | |
| 6,903,863 B1* | 6/2005 | Carniel | H04B 10/2916 |
| | | | 359/334 |
| 7,106,762 B1 | 9/2006 | Jiang et al. | |
| 7,170,909 B2 | 1/2007 | Budni et al. | |
| 7,286,587 B2 | 10/2007 | Budni | |
| 10,348,051 B1* | 7/2019 | Shah | H01S 3/06783 |
| 2018/0261969 A1* | 9/2018 | Augst | H01S 3/1618 |

OTHER PUBLICATIONS

Jackson, "Midinfrared Holmium Fiber Lasers", IEEE Journal of Quantum Electronics, vol. 42, No. 2, Feb. 2006, pp. 187-191. (Year: 2006).*

Hemming et al. "A review of recent progress in holmium-doped silica fibre sources", Optical Fiber Technology, vol. 20, issue 6, Dec. 2014, pp. 621-630. (Year: 2014).*

Tench et al. "25 W2 μum broadband polarization-maintaining hybrid Ho-and Tm-doped fiber amplifier" Applied Optics, vo. 58, No. 15 , pp. 4170-4175, May 20, 2019. (Year: 2019).*

* cited by examiner

*Primary Examiner* — Eric L Bolda
(74) *Attorney, Agent, or Firm* — Wendy W. Koba

(57) ABSTRACT

A broadband optical amplifier for operation in the 2 μm visible wavelength band is based upon a single-clad Ho-doped fiber amplifier (HDFA). A compact pump source uses a combination of discrete laser diode with a fiber laser (which may be a dual-stage fiber laser) to create a pump output beam at a wavelength associated with creating gain in the presence of Ho ions (an exemplary pump wavelength being 1940 nm). The broadband optical amplifier may take the form of a single stage amplifier or a multi-stage amplifier, and may utilize a co-propagating pump and/or a counter-propagating pump arrangement.

19 Claims, 17 Drawing Sheets

BROADBAND HO-DOPED OPTICAL FIBER AMPLIFIER

TECHNICAL FIELD

The present invention relates to rare-earth doped optical fiber amplifiers and, more particularly, to a Holmium (Ho)-doped fiber amplifier particularly configured to operate over a relatively wide bandwidth within the 2 μm wavelength region.

BACKGROUND OF THE INVENTION

There is a continuing need to develop optical systems that are capable of operating in the eye-safe 1.90-2.15 μm wavelength range. Applications such as LIDAR, atmospheric sensing (e.g., $CO_2$), WDM communication systems, and the like, are among those that will need to rely on high performance optical devices that operate within this 2 μm wavelength region. In many situations, the amount of physical space that may be dedicated to these optical systems is severely limited (e.g., vehicle-based LIDAR systems) and the ability to provide sufficient amplification within a space somewhat less than the footprint of a typical smartphone is desirable.

SUMMARY OF THE INVENTION

The needs remaining in the art are addressed by the present invention, which relates to rare-earth doped fiber amplifiers and, more particularly, to a Holmium (Ho)-doped fiber amplifier particularly configured to operate over a relatively wide bandwidth within the 2 μm wavelength region.

In accordance with the principles of the present invention, a section of single-clad, Ho-doped optical fiber is used as the gain element. The use of a single-clad optical fiber allows for both the propagating optical signal and pump beam to be coupled into the core region of the fiber.

An exemplary embodiment of the present invention takes the form of an optical amplifier for operation at an eye-safe input signal wavelength $\lambda_S$ within the 2 μm region, and uses a section of single-clad optical gain fiber in combination with a fiber laser-based pump source to form a relatively compact amplifier component. In particular, the section of single-clad optical gain fiber includes a Ho-doped core region, where an input signal is coupled into an input endface of the Ho-doped core region of the single-clad optical gain fiber so as to propagate therealong and exit at an output endface thereof. The pump source includes laser diode device used as an input to a fiber laser configured to provide a pump beam operating at a wavelength $\lambda_{PUMP}$ known to create gain in the presence of Ho ions, with sufficient pump power to effectively amplify the propagating optical input signal.

The amplifier elements may be formed of either standard single mode optical fiber (i.e., non-polarization-maintaining), or fiber of polarization-maintaining construction. For applications that operate with a single polarization signal, polarization-maintaining fiber is preferably used in order to maintain the orientation of the propagating signal along a designated axis without the need for additional polarization controlling elements. Moreover, the propagating signal may take the form of a pulsed input signal (for transmission of digital data, for example) or a continuous wave (CW) optical input. In yet another embodiment, an amplifier of the present invention may utilize only a pump light input, generating amplified spontaneous emission (ASE) over a relatively broad range as the output, where ASE is often used as a continuum source in systems supporting the transmission of multiple wavelengths.

Other and further embodiments and aspects of the present invention will become apparent during the course of the following discussion and by reference to the following drawings.

BRIEF DESCRIPTION OF THE DRAWINGS

Referring now to the drawings, where like numerals represent like parts in several views.

DETAILED DESCRIPTION

Figure 1:
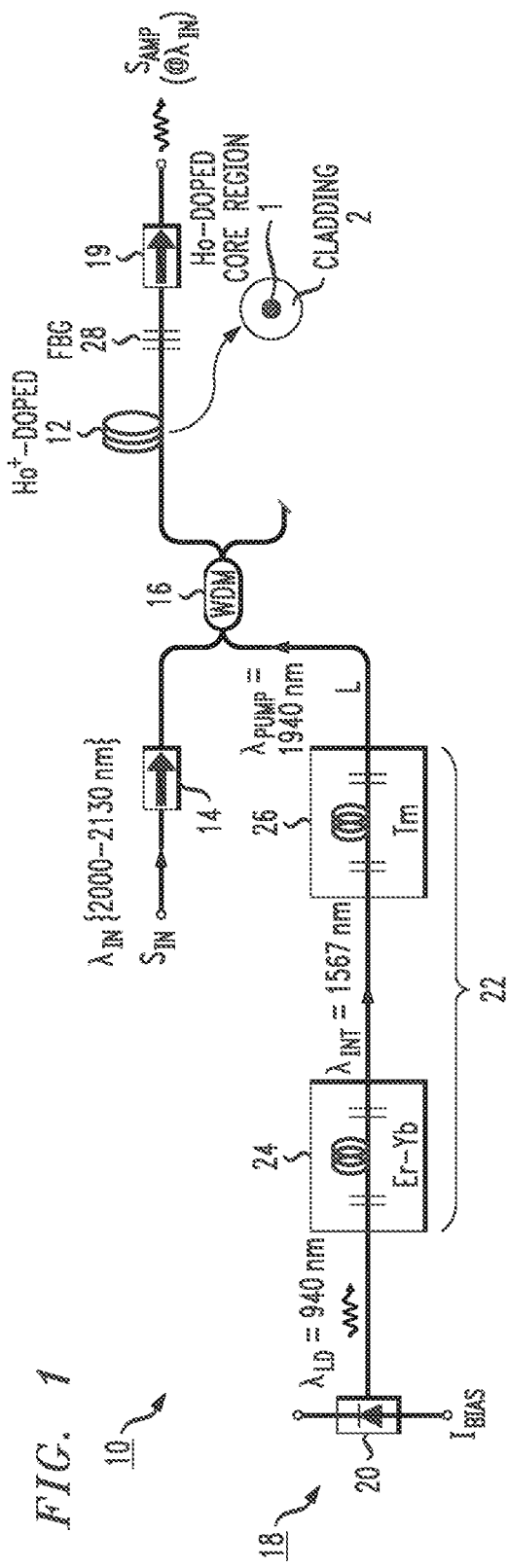
FIG. 1 contains a block diagram of an exemplary Ho-doped fiber amplifier (HDFA) formed in accordance with the principles of the present invention.

FIG. 1 contains a block diagram of an exemplary Ho-doped fiber amplifier (HDFA) 10 formed in accordance with the principles of the present invention. HDFA 10 is based upon the use of a section of single-clad optical fiber 12 that has been fabricated to include a Ho-doped core region 1, surrounded by a silica-based cladding layer 2 (shown in the inset of FIG. 1). In contrast to various prior art doped-fiber amplifiers that are based upon the use of at least a "double-clad" gain fiber, the arrangement of the present invention operates in a limited region of output power that allows for a single-clad optical fiber to be used as the gain fiber. Advantageously, the use of single-clad optical fiber simplifies the optical coupling into and out of the gain fiber, while also allowing the final product to fit within a relatively small footprint.

As mentioned above, recent developments in various types of optical-based sensing applications have created the need for optical systems that operate in the eye-safe wavelength band of 1.9-2.1 µm. One need is for an optical amplifier that is able to impart an appreciable level of gain to input signals across a relatively wide wavelength region within this eye-safe band; that is, there is an on-going need for an eye-safe broadband amplifier (the ability to function over a broad input signal range particularly useful when implemented as a preamplifier component).

FIG. 1 shows an input optical signal (denoted $S_{IN}$) operating within this eye-safe band being used as the input signal for HDFA 10. For the sake of explanation, input signal $S_{IN}$ is defined as being a single frequency input, operating at an input wavelength XIN within the region of about 2000-2130 nm (i.e., within this general 2 µm band associated with "eye safe" optical signals). Input optical signal $S_{IN}$ is shown in FIG. 1 as passing through an input isolator 14 and is thereafter coupled to a signal port of a wavelength division multiplexer (WDM) 16. Pump light L from a pump source 18 operating at an appropriate pump wavelength $\lambda_{PUMP}$ (here, shown as about 1940 nm) is coupled into a pump port of WDM 16, with the output from WDM 16 being a combination of both the input signal $S_{IN}$ and pump light L. The combination of $S_{IN}$ and L is thereafter applied as an input to single-clad gain fiber 12. In particular, WDM 16 is configured to couple these inputs into Ho-doped core region 1 of single-clad gain fiber 12.

The arrangement as shown in FIG. 1 is referred to as a "co-propagating" amplifier configuration since both the input signal $S_{IN}$ and pump light L propagate in the same direction through single-clad gain fiber 12. Amplification of input signal $S_{IN}$ within single-clad gain fiber 12 is achieved via a process well-known in the art where presence of pump light L at an appropriate wavelength (e.g., $\lambda_{PUMP}$=1940 nm) functions to excite the Ho ions present in core region 1 of gain fiber 12, resulting in amplification of input optical signal $S_{IN}$. The amplified output signal $S_{AMP}$ from single-clad gain fiber 12 is shown in FIG. 1 as passing through an output isolator 19 before exiting HDFA 10.

In accordance with the principles of the present invention, pump source 18 may be particularly configured to utilize the combination of a discrete semiconductor laser diode 20 and a fiber laser 22 to create a pump output L at a wavelength that is known to impart gain to an optical signal propagating through a section of Ho-doped optical fiber. In one exemplary embodiment, laser diode 20 may comprise a GaAs laser diode emitting at a wavelength $\lambda_{LD}$ of about 940 nm, which is used as a pump input to fiber laser 22, in this example generating a pump output L at a useful pump wavelength $\lambda_{PUMP}$ of about 1940 nm.

The specific embodiment of the present invention as shown FIG. 1 utilizes a fiber laser 22 that comprises a concatenation of two separate fiber-based lasers, namely, an input Er—Yb co-doped fiber laser 24, followed by an output Tm-doped fiber laser 26. In operation, the input pump light from laser diode 20 (operating at $\lambda_{LD}$ of about 940 nm) is provided as an input to Er—Yb co-doped fiber laser 24. The presence of the 940 nm light beam within the co-doped Er—Yb gain medium of fiber laser 24 generates as an output an optical beam operating at an intermediate wavelength $\lambda_{INT}$ of about 1567 nm. In turn, this output from Er—Yb fiber laser 24 is subsequently applied as an input to Tm-doped fiber laser 26, where it is used to generate a lasing output at a wavelength of about 1940 nm, a wavelength known to support amplification in an Ho-doped fiber (such as single-clad gain fiber 12). Thus, the output from Tm-doped fiber laser 26 is defined as the output from pump source 18, the pump beam operating at an appropriate wavelength $\lambda_{PUMP}$ (e.g., 1940 nm) and at an appropriate power level (e.g., about 1 W) to amplify input signal $S_{IN}$ propagating through Ho-doped gain fiber 12. The power level of the pump output is controlled to maintain the desired limited output power in the amplified signal that permits the use of single-clad Ho-doped gain fiber. It is to be understood that both Er—Yb co-doped fiber laser 24 and Tm-doped fiber laser 26 each include input and output reflectors (typically formed as fiber Bragg gratings (FBGs)) to create a laser cavity along their respective gain fibers.

The arrangement shown in FIG. 1 also includes an FBG 28 positioned between the output from gain fiber 12 and output isolator 19. FBG 28 is considered as an "optional" element, and is used in this particular embodiment to block any residual pump energy present in the output from gain fiber 12 from propagating along with the amplified output signal. That is, FBG 28 is formed to exhibit essentially 100% reflectance at the pump wavelength (e.g., 1940 nm) so as to filter any residual pump from the amplified output signal. Advantageously, this residual pump is reflected back into gain fiber 12, where it may function as a counter-propagating pump wave (albeit at a substantially reduced power level), providing additional amplification to the input signal $S_{IN}$.

Figure 2:
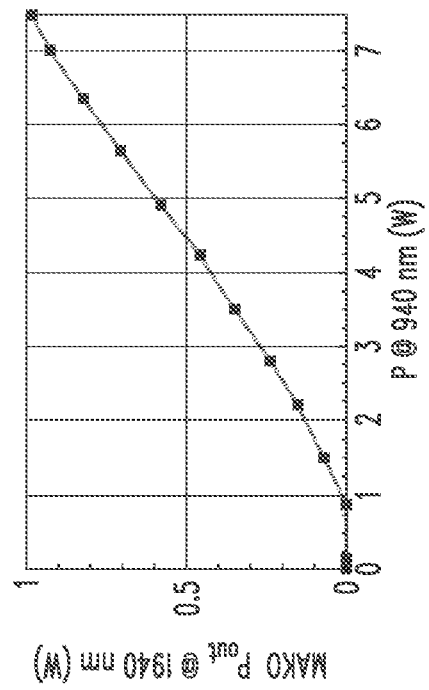
FIG. 2 is a plot of available pump power, created by the combination of a discrete laser diode and fiber laser structure, as a function of the laser diode power applied as an input to the fiber laser structure.

FIG. 2 contains a plot of the output power available from pump source 18 as a function of the input power of laser diode 20 that is presented to fiber laser configuration 22. Here, it is shown that for an input laser diode power of about 2 W, the generated output power at the wavelength $\lambda_{PUMP}$=1940 nm is on the order of about 0.1 W. The relationship is shown to be essentially linear, with an input power from laser diode 20 on the order of about 7 W providing an output pump power of about 1 W.

Figure 3:
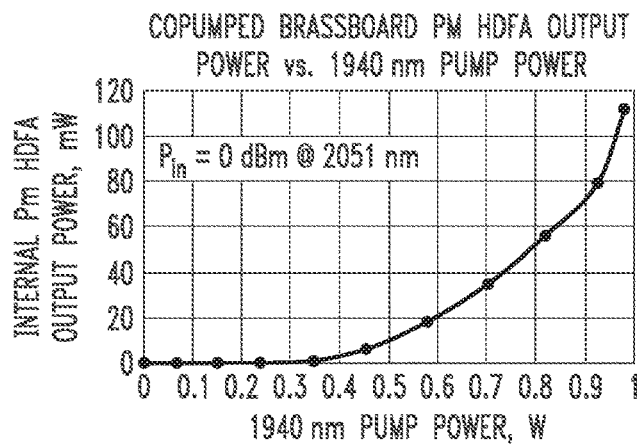
FIG. 3 is a plot of output power from the HDFA as shown in FIG. 1, as a function of the power of the pump beam applied as an input to the Ho-doped gain fiber.

Continuing with this discussion, FIG. 3 contains a graph indicating the amount of internal output power (i.e., power measured prior to final packaging) created by HDFA 10 as a function of applied pump power. Referring back to the data of FIG. 2, the applied pump power of FIG. 3 is shown to range from 0 to 1 W, with a useable range being between about 0.40 and 0.98 W. The internal amplifier output power achieved for 0.98 W of input pump power is shown to be on the order of 110 mW (in one case, an output power of 122.2 mW was generated). The output power of 122.2 mW is specifically associated with an input signal $S_{IN}$ operating at an eye-safe wavelength $\lambda_{IN}$ of 2051 nm, with an input power on the order of 0 dBm (1.0 mW).

Figure 4:
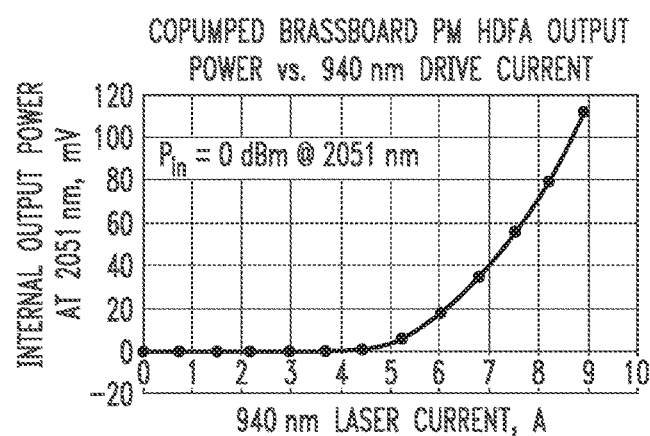
FIG. 4 plots the output power from the HDFA as shown in FIG. 1, as a function of the drive current applied as an input to the laser diode input device of the pump source.

Another way to analyze the amount of generated output power for this single-clad HDFA amplifier is by evaluating the amount of output power achieved as a function of the input drive current required to operate pump laser diode 20 (shown as $I_{BIAS}$ in FIG. 1). That relationship is plotted in FIG. 4, which shows that a drive current in the range from about 5 A to approaching 9 A may be used, with a value for $I_{BIAS}$ of about 8.9 A is able to provide an output power of about 112 mW.

Figure 5:
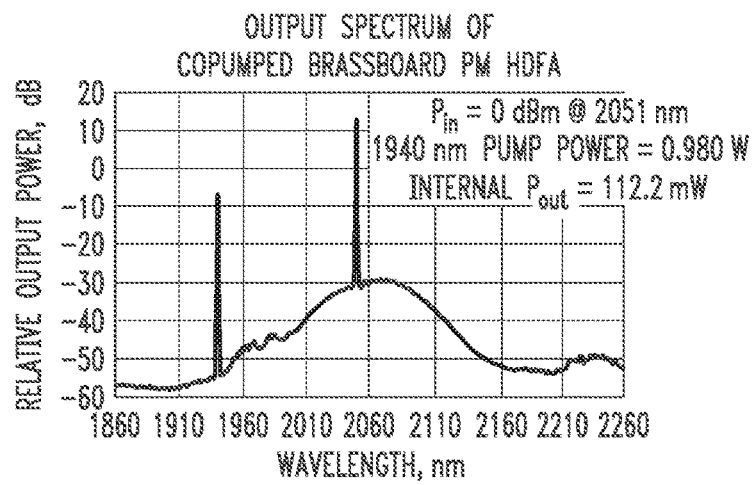
FIG. 5 is a plot of the broadband output spectrum associated with the configuration of FIG. 1, the data associated with the pump source configured to provide maximum pump output power.

FIG. 5 is a plot of an exemplary optical spectrum of HDFA 10 as illustrated in FIG. 1. Here, it is shown that a relatively wide portion of the eye-safe spectral range may be amplified when passing through a section of single-clad Ho-doped gain fiber, allowing for the inventive HDFA of the present invention to find use as a preamplifier in a wide variety of applications. This plot is also associated with a maximum pump power of about 0.98 W, for an input signal $S_{IN}$ at an eye-safe wavelength $\lambda_{IN}$ of 2051 nm, exhibiting an input power on the order of about at 0 dBm. The amplified input signal $S_{IN}$ is clearly evident as a spike in this spectrum, and positioned close to the background "peak" of the amplified spontaneous emission (ASE), indicating that the choice of fiber length for Ho-doped gain fiber 12 is appropriate for this situation. The data as shown in FIG. 5 is associated with a configuration of HDFA 10 that does not include FBG 28, but instead allows any remaining pump light at the output of gain fiber 12 to continue to propagate with the amplified signal and pass through output isolator 19. The residual feedthrough of pump power at $\lambda_{PUMP}$=1940 nm is also evident in the spectrum of FIG. 5 (at a power level about 20 dB down from the signal amplification), indicating an efficient use of the available pump power in the co-pumped configuration of HDFA 10 as shown in FIG. 1. The presence of residual pump power will be discussed below in association with a multi-stage HDFA embodiment illustrated in FIG. 19.

Figure 6:
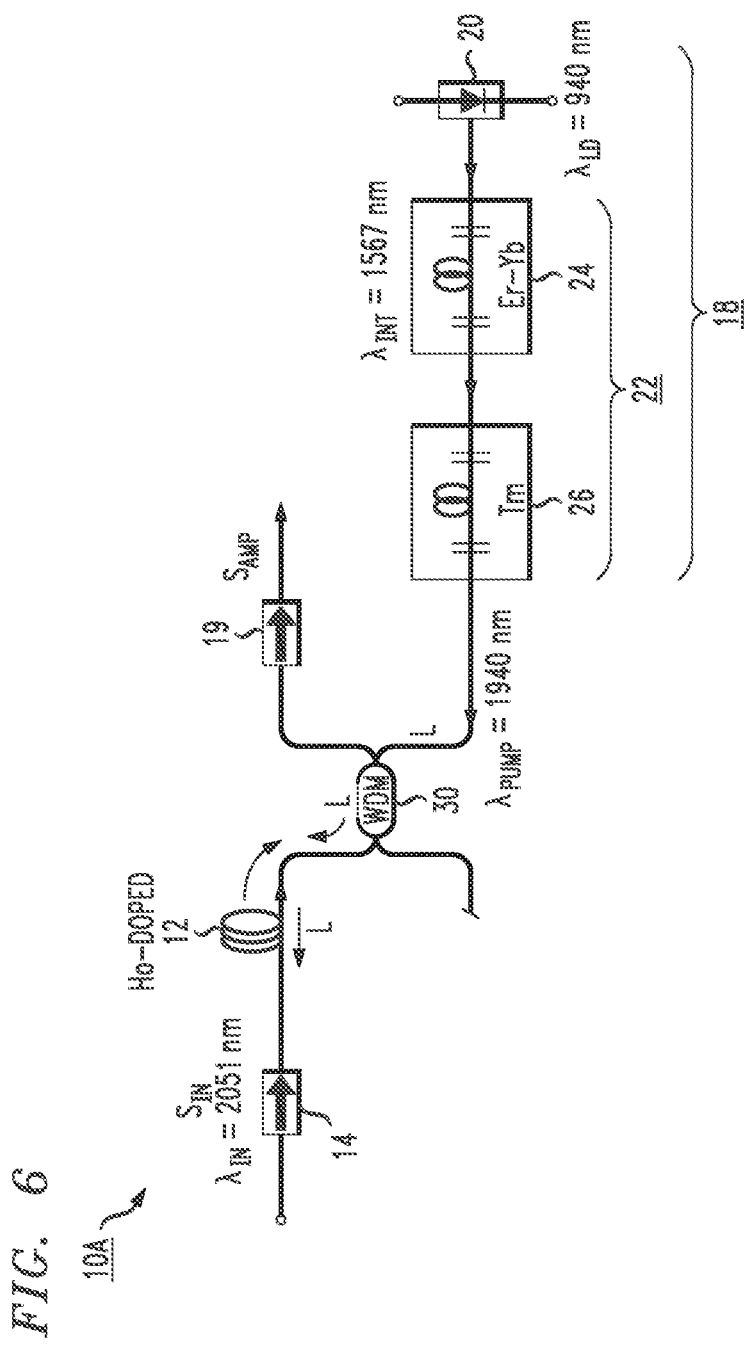
FIG. 6 is a block diagram of an alternative embodiment of an HDFA of the present invention, in this case using a counter-propagating pump beam to impart gain to a propagating input optical signal.

FIG. 6 illustrates an alternative embodiment of the present invention, in this case taking the form of a counter-propagating HDFA. Identified as HDFA 10A, the configuration as shown in FIG. 6 utilizes a similar single-clad gain fiber 12, pump source 18 and isolators 14, 19 as described above in association with HDFA 10 of FIG. 1. Here, however, in order to create a counter-propagating fiber amplifier configuration, a WDM 30 is disposed at the output of single-clad gain fiber 12, with pump source 18 coupled to a pump input port of WDM 30 and used to direct pump light L through gain fiber 12 in a counter-propagating direction (i.e., counter to the direction of propagation of input signal $S_{IN}$ through gain fiber 12). Again, pump source 18 is based in this example upon the use of laser diode 20 in combination with a fiber laser 22 (here, the same dual-stage arrangement of Er—Yb doped fiber laser 24 and Tm-doped fiber laser 26 as discussed above) to create a pump beam at an appropriate pump wavelength $\lambda_{PUMP}$ for amplification within a Ho-doped optical fiber.

HDFA 10A functions in the same manner as HDFA 10 of FIG. 1 in terms of using pump light at a wavelength $\lambda_{PUMP}$ of 1940 nm (for example) to excite the Ho ions present in single-clad gain fiber 12 and thus amplify the propagating optical signal (that is, imparting gain to the propagating signal by transferring the energy associated with the ion excitation to signal $S_{IN}$), forming an output amplified signal $S_{AMP}$.

In contrast to co-pumping HDFA 10 of FIG. 1, counter-propagating pump light L in the arrangement of FIG. 6 interacts with propagating input signal $S_{IN}$ in a very different manner, since the power level of pump light L is greatest at the far-end of single-clad gain fiber 12 and thereafter diminishes as pump light L propagates towards the input end of gain fiber 12 (where the power $P_S$ of the input signal $S_{IN}$ is the greatest). The counter-propagating amplifier arrangement thus can create similar gain (in terms of magnitude), while also providing greater slope efficiency and power conversion efficiency than the co-propagating embodiment.

Figure 7:
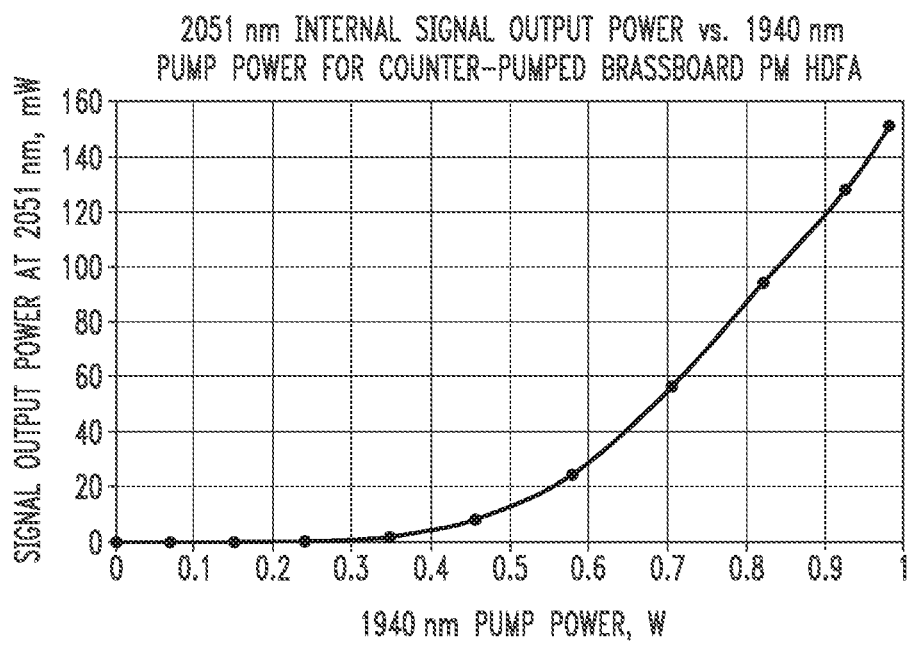
FIG. 7 is a plot of output power from the counter-pumped HDFA as shown in FIG. 6, as a function of the power of the pump beam propagating through the Ho-doped gain fiber.
Figure 8:
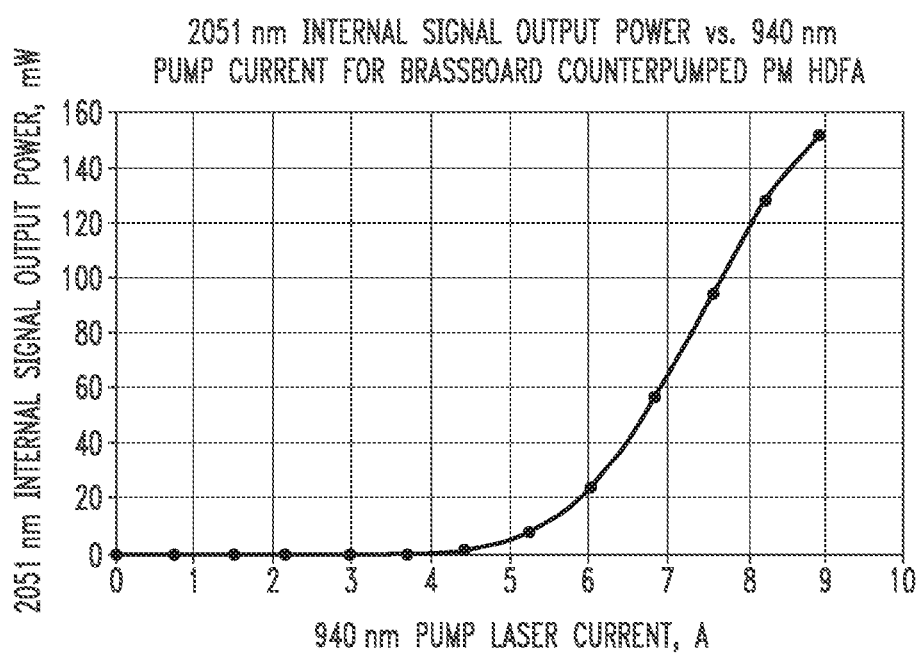
FIG. 8 plots the output power from the counter-pumped HDFA as shown in FIG. 6, as a function of the drive current applied as an input to the laser diode input device of the pump source.

FIG. 7 is a plot of output power from counter-pumped HDFA 10A as a function of pump power (similar to the FIG. 3 of power conversion efficiency for co-pumped HDFA 10). FIG. 8 shows the output power of counter-pumped HDFA 10A as a function of drive current input to pump source 18 (compare to co-pumped results shown in FIG. 4). These results show that the maximum internal output power achieved for counter-pumped HDFA 10A is on the order of about 152 mW. The counter-pumped configuration is found to provide about 25% (1.0 dB) greater internal output power than the co-pumped configuration (maximum internal output power of about 122 mW). The increased internal output power for the counter-pumped configuration is expected and typical for a Ho-doped fiber amplifier as shown in FIG. 6 where the pump power is greatest within the region of the gain fiber where the input signal has already experienced a degree of amplification.

Figure 9:
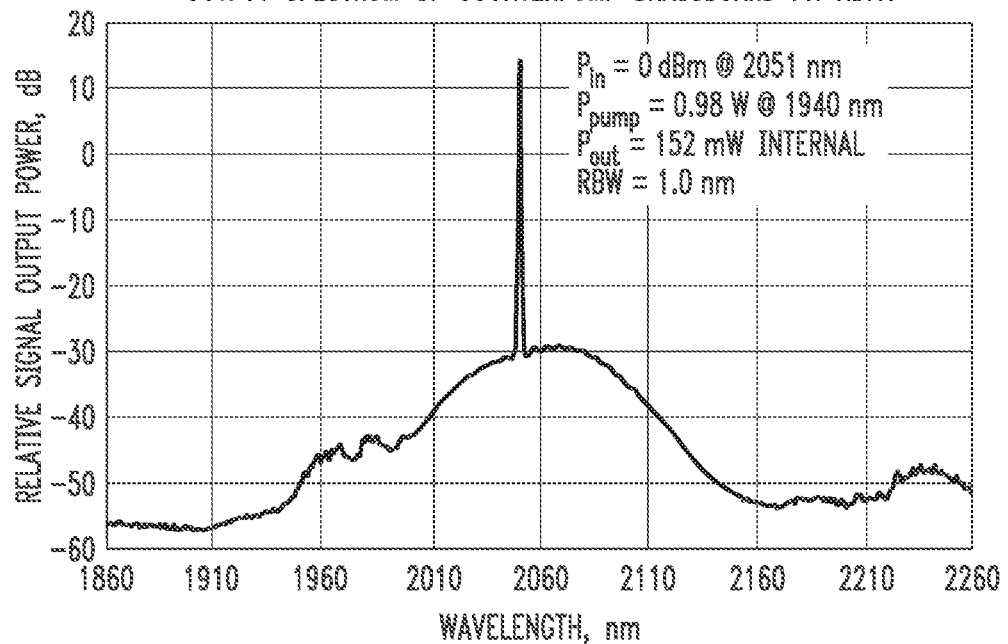
FIG. 9 is a plot of the broadband output spectrum associated with the counter-pumped configuration of FIG. 6, the data associated with the pump source configured to provide maximum pump output power.

The measured output spectrum for counter-pumped HDFA 10A (associated with a maximum pump power of 0.98 W and an input signal power of 2.5 dBm) is shown in FIG. 9. As with the co-pumped spectrum shown in FIG. 5, the amplification of the signal wavelength is evidenced by a significant spike in the spectrum and is located close to the peak of the background ASE (again, a confirmation that the selected length for gain fiber 12 is appropriate). Inasmuch as this is a counter-pumped configuration, there is no residual feedthrough of energy at pump wavelength 1940 nm.

Figure 10:
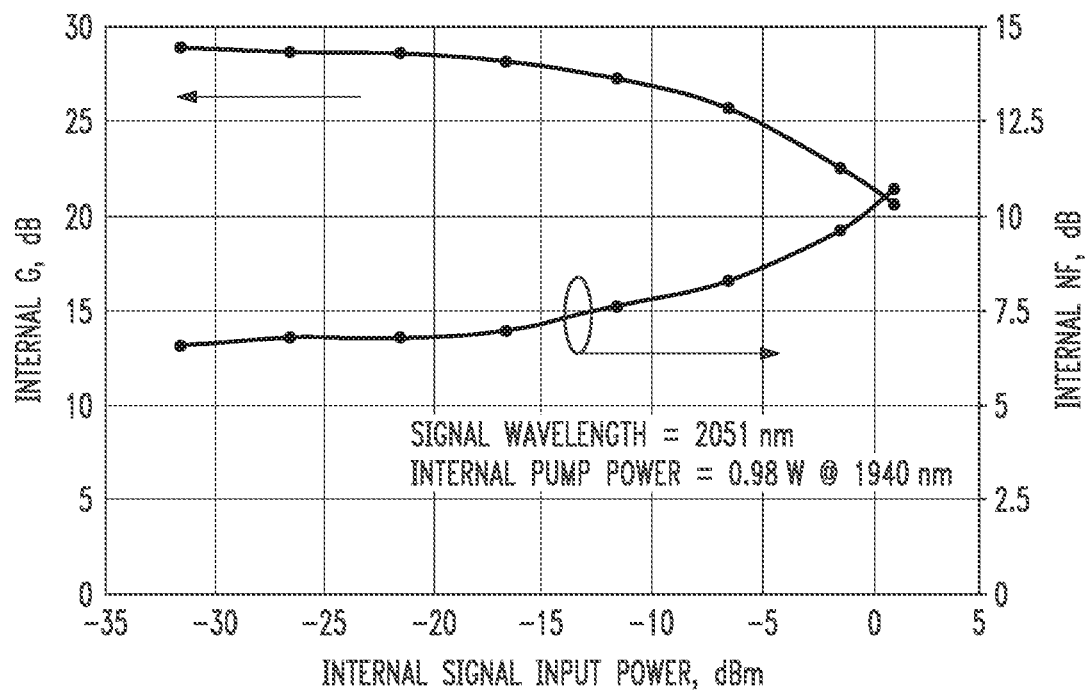
FIG. 10 contains plots of both gain (G) and noise figure (NF) for the counter-pumped HDFA as shown in FIG. 6.

FIG. 10 plots the measured gain (G) and noise figure (NF) for counter-pumped HDFA 10A. The maximum gain is seen to be about 28.9 dB, with a minimal noise figure of about 6.8 dB. The relatively high small signal gain of nearly 29 dB, along with the saturated internal output power of 152 mW (for a modest pump power of 0.98 W) indicates that counter-pumped HDFA 10A is a good candidate for both preamplifier and power amplifier applications. It is to be noted that for an input signal power of 0 dBm, the maximum measured "fiber coupled" (i.e., external) output signal power is about 77 mW.

Figure 11:
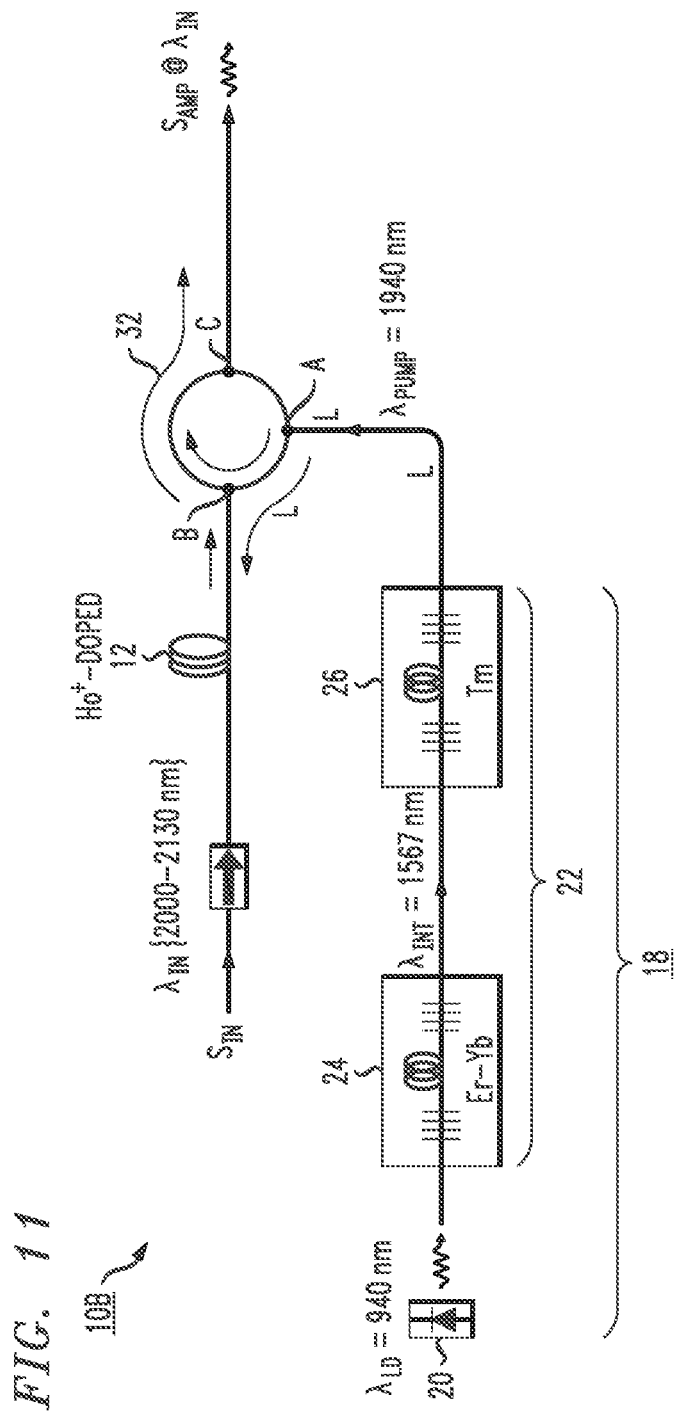
FIG. 11 illustrates a compact arrangement of a counter-pumped HDFA, in this case using an optical circulator to control the directional flow of the pump and amplified input signal.

A relatively compact alternative arrangement of a counter-pumped HDFA is shown in FIG. 11. In this embodiment, an exemplary counter-pumped HDFA 10B utilizes an optical circulator 32 in place of WDM 30 and output isolator 19 as shown in the arrangement of FIG. 6. As is well-known in the art, an optical circulator (which may be a 3-port device or a 4-port device) functions such that a signal entering one port will exit the "next" port in sequence, with a uni-directional flow maintained within the device. For HDFA 10B of FIG. 11, input pump light L is shown as coupled into port A of optical circulator 32 and thereafter directed to follow a path through circulator 32 to exit the device at port B, where port B is coupled to single-clad gain fiber 12. Thus, pump beam L will be introduced into the output of single-clad gain fiber 12 in the same manner as counter-propagating HDFA 10A of FIG. 6.

Continuing with the description of HDFA 10B, the interaction of the counter-propagating pump light L with input signal $S_{IN}$ within single-clad gain fiber 12 results in creating the amplified signal $S_{AMP}$, which exits gain fiber 12 and enters port B of optical circulator 32. In accordance with the operational properties of circulator 32, amplified signal $S_{AMP}$ will flow through circulator 32 and be directed to exit at the "next" port in sequence, shown as port C in the arrangement of FIG. 11. Advantageously, the uni-directional nature of optical circulator 32 prevents any of the amplified signal from reflecting back along the signal path. Thus, there is no need to include an output optical isolator in an arrangement using an optical circulator control the movement and coupling of various optical waves.

Figure 12:
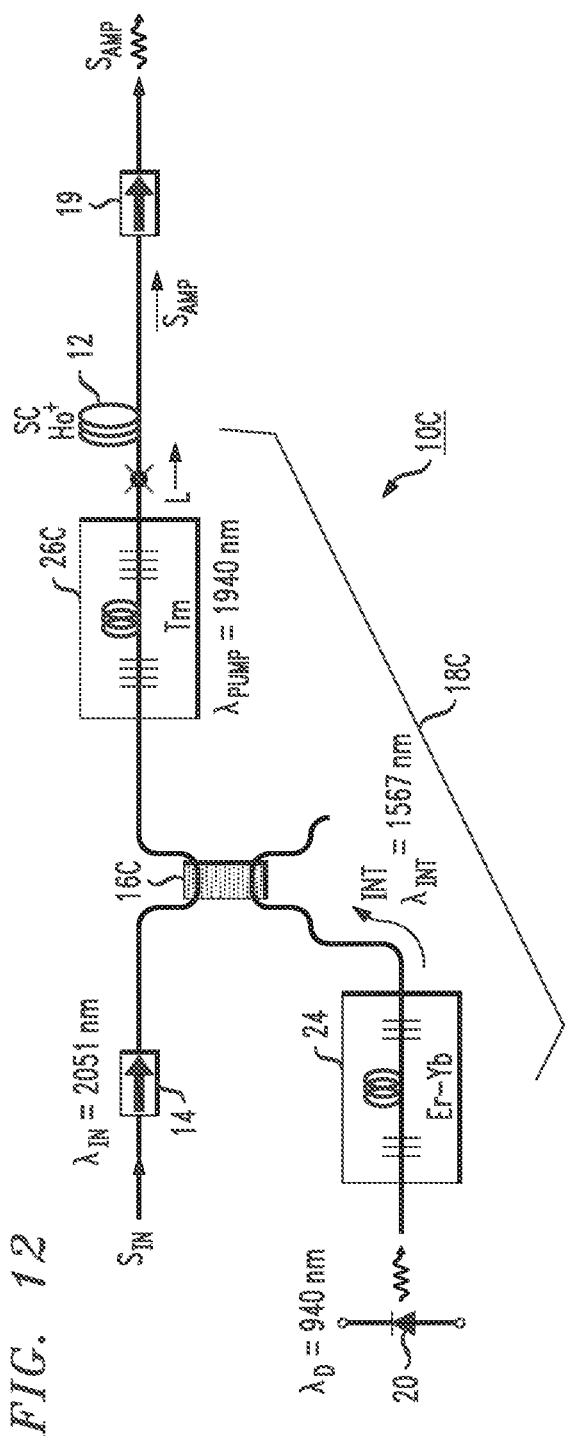
FIG. 12 shows an embodiment of the present invention where the pump source utilizes a pair of fiber lasers, one fiber laser disposed is in the signal path adjacent to the Ho-doped gain fiber (referred to as a "split pump" embodiment)

FIG. 12 contains a block diagram of yet another embodiment of the present invention, where HDFA 10C is shown as comprising a different pump source 18C. In this case, the pair of fiber lasers used to create a pump beam operating at the desired wavelength of 1940 nm is split along two different signal paths. Similar to the configurations described above, a discrete laser diode source 20 is used to provide the initial input pump light (at a wavelength of, for example, 940 nm), which enters Er—Yb co-doped fiber laser 24 and provides an intermediate beam INT at the wavelength of, for example, 1567 nm.

For this particular embodiment of the present invention, a WDM 16C is used to combine (multiplex) the input optical signal $S_{IN}$ (at input wavelength $\lambda_{IN}$=2051 nm, for example) and the intermediate pump beam INT. The combination of these two light waves is then passed through a Tm-doped fiber laser 26C, which is defined as the output stage of pump source 18C even though it is located along the main signal path and positioned immediately prior to single-clad gain fiber 12 (these two fiber sections may be spliced together to reduce signal loss). It is contemplated that input signal $S_{IN}$ is not significantly attenuated or otherwise affected by propagating through fiber laser 26C.

As with the embodiments discussed above, Tm-doped fiber laser 26C interacts with the intermediate pump beam to convert it to the pump light output L at the desired wavelength $\lambda_{PUMP}$=1940 nm. Pump light L and input signal $S_{IN}$, which are co-propagating at the output of Tm-doped fiber laser 26C, are subsequently coupled into Ho-doped core region 1 of single-clad gain fiber 12, forming the amplified output signal $S_{AMP}$ in the manner described above.

Figure 13:
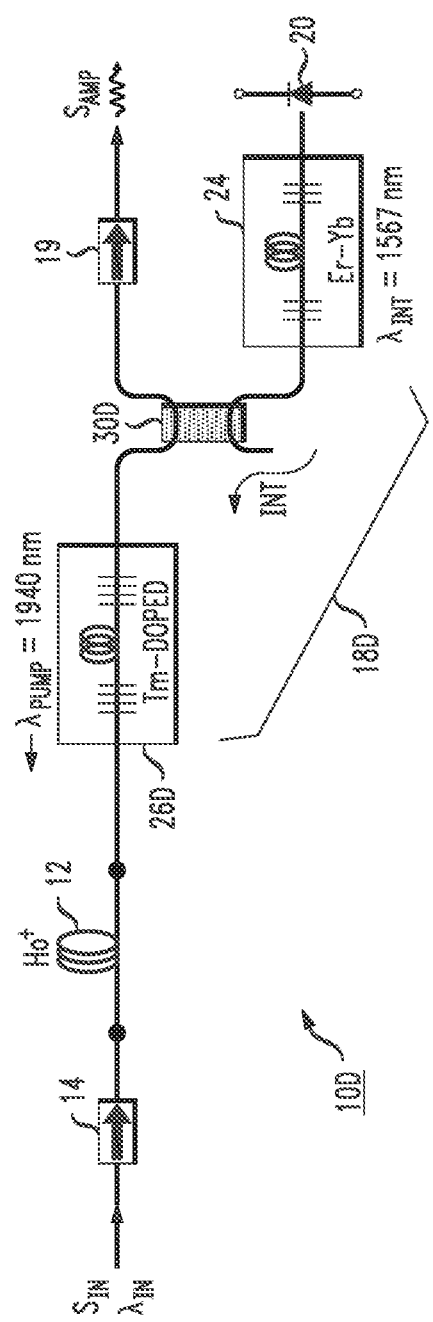
FIG. 13 is a counter-pumped alternative of the split-pump embodiment of FIG. 12.

FIG. 13 illustrates a counter-pumped version of the "split" pump arrangement of FIG. 12, denoted as HDFA 10D. Again, the combination of laser diode source 20 and Er—Yb co-doped fiber laser 24 are used to create a pump beam INT operating at the "intermediate" pump wavelength. In accordance with this counter-propagating arrangement, a WDM 30D is used to inject pump light at the intermediate wavelength $\lambda_{INT}$=1567 nm into the main signal path, where it is then passes through a Tm-doped fiber laser 26D to form a pump beam L at the proper wavelength for providing gain in Ho-doped single-clad gain fiber 12 (e.g., wavelength $\lambda_{PUMP}$=1940 nm). The combination of Tm-doped fiber laser 26D with Er—Yb co-doped fiber laser 24 and laser diode device 20 are defined as forming a pump source 18D.

It is to be understood that an HDFA formed in accordance with the present invention may be used in conjunction with either a "continuous wave" (CW) input optical signal or a pulsed input optical signal, where the latter is typically the case when used to amplify a digital data signal being transmitted through an optical communications network (for example). Additionally, while many experimental configurations have been formed of polarization-maintaining optical fiber, it is contemplated that single mode fiber may be used as an alternative where the polarization state of the propagating signal is not a relevant factor.

Figure 14:
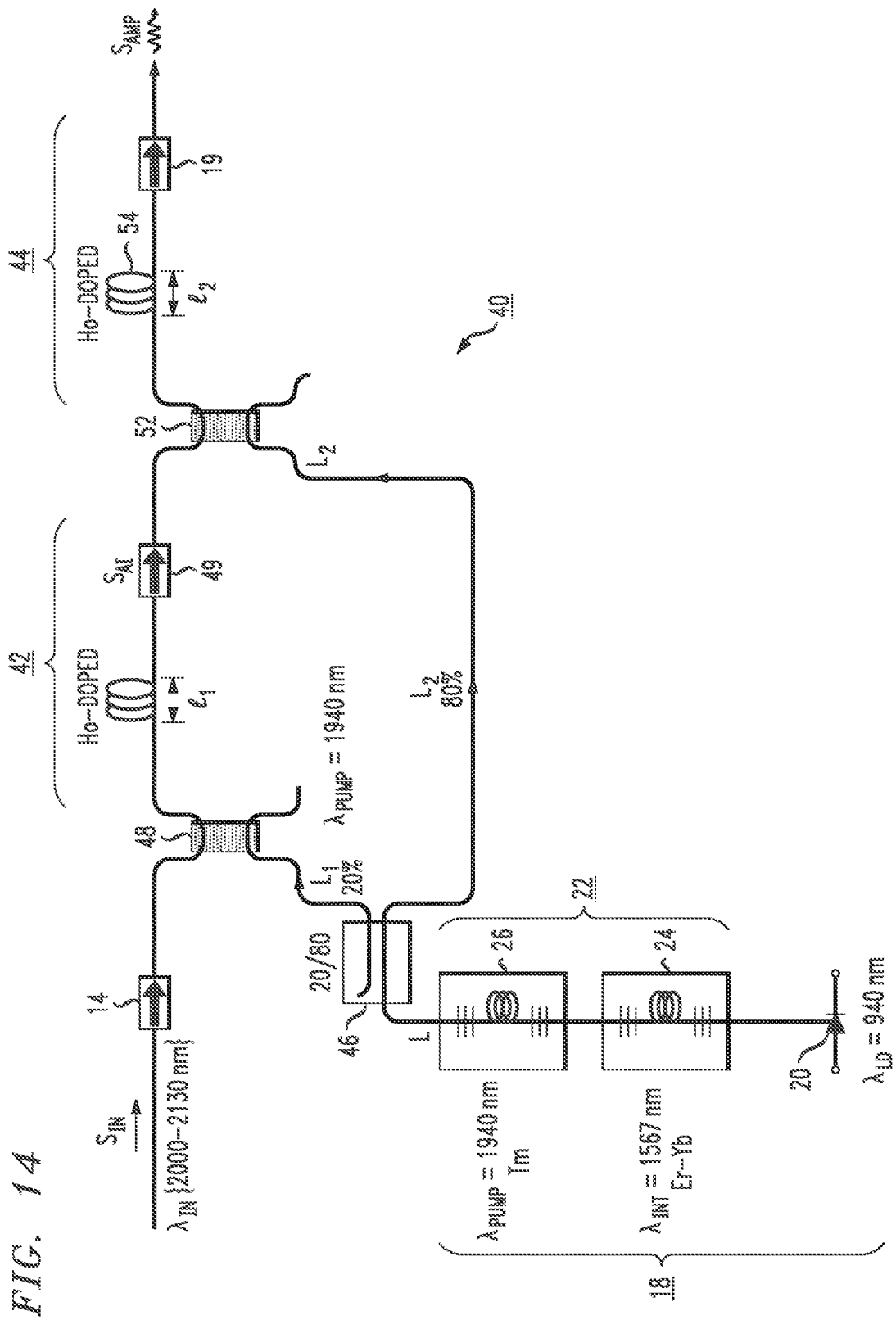
FIG. 14 is a diagram of another embodiment of the present invention, shown here as a multi-stage HDFA, each stage based upon the use of a single-clad Ho-doped gain fiber.

FIG. 14 illustrates yet another embodiment of the present invention, in this case formed as a multi-stage amplifier 40. In this particular configuration, multi-stage HDFA 40 comprises a pair of concatenated amplifier stages 42, 44, with each amplifier stage taking the form of a single-clad HDFA as discussed above. A single pump source 18 is used in this particular arrangement to supply the pump light input L at $\lambda_{PUMP}$ to both first stage 42 and second stage 44 (alternatively, it is to be understood that each stage may include its own pump source, operating at a power appropriate for that stage).

A power splitter 46 is used in this particular embodiment to control the ratio of pump powers within the amplifier stages, creating two separate pump beams. A first pump beam $L^1$ output from power splitter 46 (operating at a first power level $P_1$) is provided as a pump input to first amplifier stage 42, with a second beam $L_2$ (operating at a second power level $P_2$) provided as the pump source for second stage 44. The sum of $P^1$ and $P_2$ is ideally equal to the output power $P_{PUMP}$ from pump source 18.

Referring now in particular to first stage 42, the incoming signal $S_{IN}$ and first pump beam $L^1$ are provided as inputs to a first WDM 48, which directs both beams along a common output fiber, which in this case is a first section of single-clad Ho-doped gain fiber 50 (having a length $l_1$). Similar to the configurations described above, the presence of pump light at 1940 nm (or another appropriate wavelength $\lambda_{PUMP}$ for excitation of Ho ions) results in transferring energy to propagating signal $S_{IN}$, generating an amplified output signal $S_{A1}$. Amplified output $S_{A1}$ is typically passed through an inter-stage isolator 49 and then provided as an input (amplified) signal to second HDFA amplifier stage 44. As shown in FIG. 14, a second WDM 52 is disposed to receive this amplified signal $S_{A1}$, as well as the larger portion $L_2$ of the pump beam. The combination of these two beams as provided by WDM 52 is then coupled into a second section of single-clad Ho-doped gain fiber 54 (having a length $l_2$).

In accordance with this multi-stage embodiment of the present invention, each amplifier stage may be separately optimized, in terms of gain fiber length ($l_1$, $l_2$) and applied pump power ($P_1$, $P_2$), such that one stage may provide maximum small signal gain (for example, first stage 42) and the other stage may provide maximum power (here, second stage 44). One particular configuration that exemplifies this optimization may use a first stage gain fiber 50 with $l_1=3.0$ m, pumped with 20% of the total pump power, in combination with a second stage gain fiber 54 of length $l_2=2.0$ m, receiving 80% of the pump power.

Figure 15:
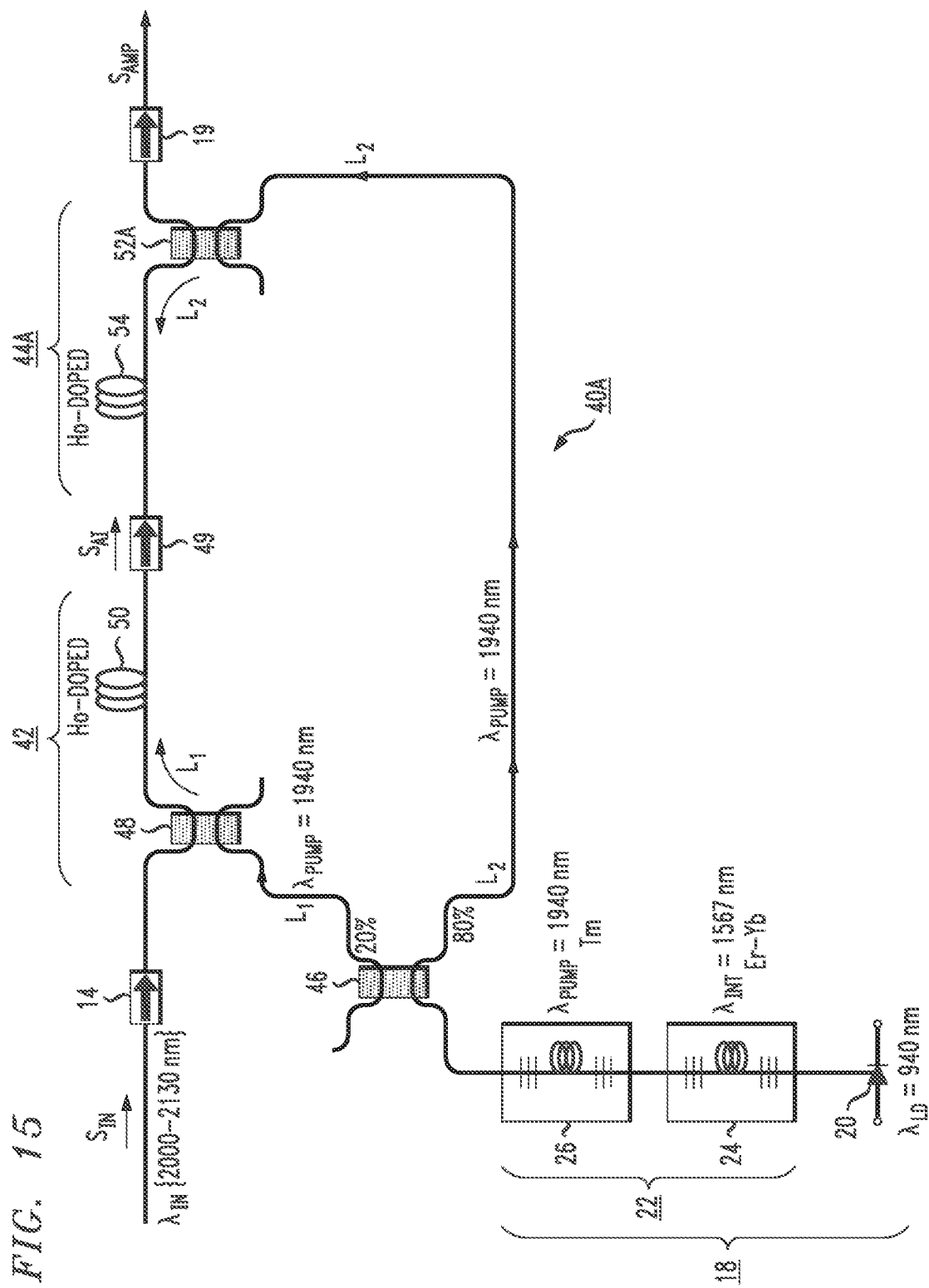
FIG. 15 is an alternative configuration of the multi-stage embodiment of FIG. 14, where a shared pump source is used as a co-propagating input to a first amplifier stage and a counter-propagating input to a second amplifier stage.

FIG. 15 illustrates an alternative configuration of the multi-stage amplifier of FIG. 14 (denoted as HDFA 40A in FIG. 15). The components of first stage 42 are the same as described above in association with FIG. 12. In this case, however, second stage 44A utilizes a counter-propagating pump beam, provided via a WDM 52A disposed at the output of Ho-doped gain fiber 54. As with the counter-pumped single stage HDFA 10A discussed above in association with FIG. 6, second stage 44A provides improvement in slope efficiency and power conversion efficiency over the co-pumped arrangement, albeit at the cost of a small decrease in overall gain.

Figure 16:
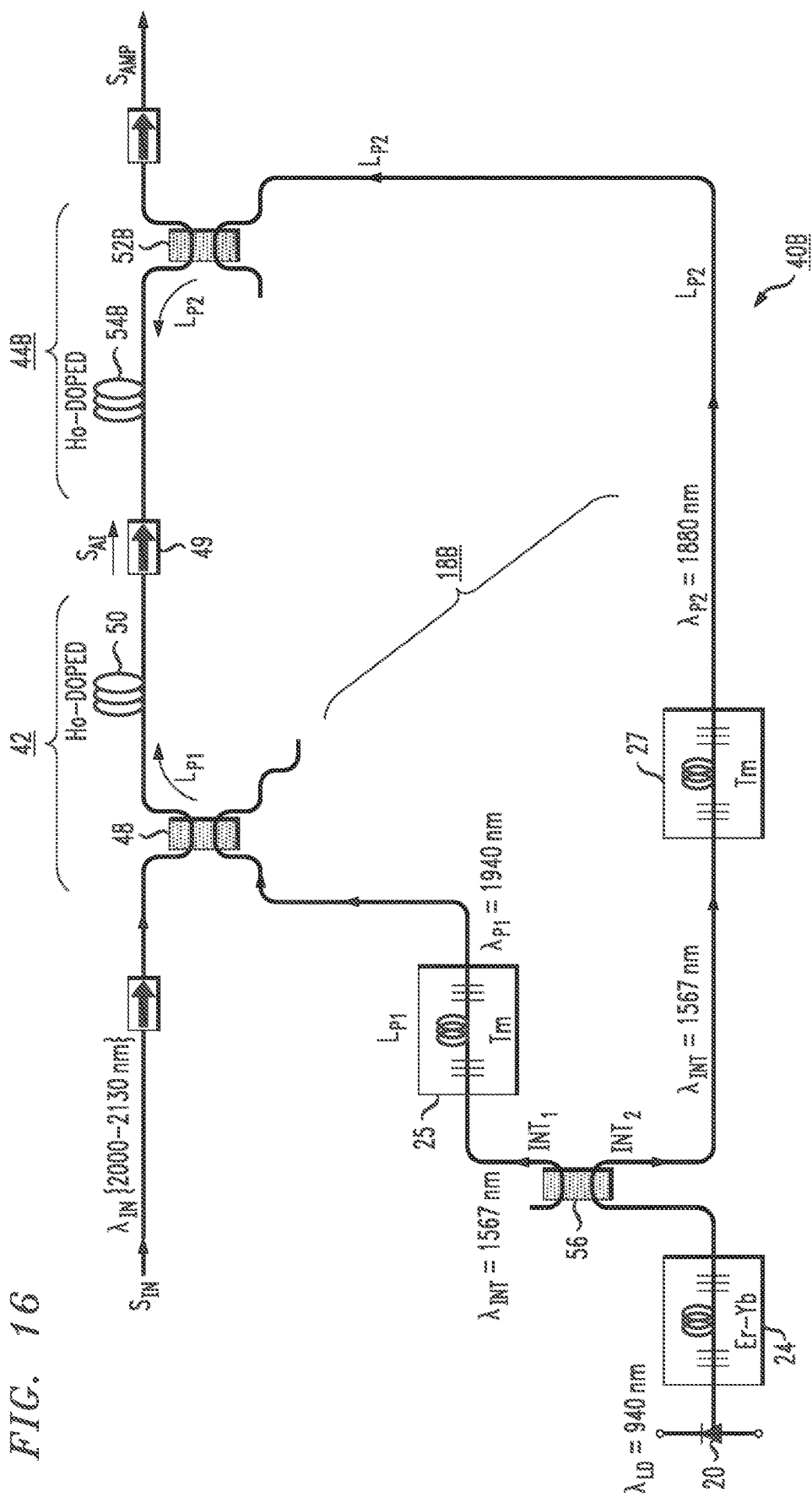
FIG. 16 illustrates yet another configuration of the multi-stage HDFA of the present invention, where in this case a pump source is designed to provide pump light at two different wavelengths that are both capable of introducing gain within an Ho-doped fiber, the two different wavelengths used by separate amplifying stages and created by using different fiber lasers within a pump light input to its respective amplifying stage.

A variation of a co-pumped and counter-pumped multi-stage HDFA 40A is shown in FIG. 16 as HDFA 40B. In this particular embodiment, a novel pump source 18B is specifically designed to optimize the pump energy delivered to each amplifying stage. As will be discussed in detail below, pump source 18B is configured to provide pump light at a first pump wavelength $\lambda_{P1}$ as a (co-propagating) input to first stage 42, as well as pump light at a second pump wavelength $\lambda_{P2}$ as a (counter-propagating) input to a second stage 44B (which now uses a different pump wavelength to provide amplification).

The generation of two different pump wavelengths from a single input laser diode device 20 is accomplished by replacing Tm-doped fiber laser 24 of fiber laser component 22 (as used in various embodiments described above) with a pair of Tm-doped fiber lasers 25, 27, where each Tm-doped fiber laser is positioned along the separate input pump path to its respective HDFA amplifier stage 42B, 44B. In particular, Tm-doped fiber laser 25 is shown as disposed along the pump signal path coupled to first HDFA amplifier stage 42 and used form a first pump light input $L_{P1}$ at the first pump wavelength $\lambda_{P1}$. Similarly, Tm-doped fiber laser 27 is disposed along the pump signal path coupled to second HDFA amplifier stage 44B, providing a pump light input $L_{P2}$ to second amplifier stage 44B.

Continuing with reference to pump source 18B, discrete laser diode device 20 is used in the same manner as discussed above to provide input pump generation light operating (typically) at $\lambda_{LD}=940$ nm. And also similar to the configurations described above, the light at 940 nm is provided as an input to Er—Yb fiber laser 24 to generate as an output at intermediate pump beam INT, operating at an intermediate wavelength (here, $\lambda_{INT}=1567$ nm). As shown in FIG. 16, the output from Er—Yb fiber laser 24 is passed through an optical splitter 56, in this case configured to evenly split the optical power between the two amplifier stages. Shown as beams $INT_1$ and $INT_2$ in FIG. 16, each of these is provided as an input to its associated Tm-doped fiber laser (i.e., $INT_1$ applied as an input to Tm-doped fiber laser 25 and $INT_2$ applied as an input to Tm-doped fiber laser 27).

By controlling the design of the FBGs used to define the lasing cavity within each of these Tm-doped fiber lasers, each may be adjusted to creating lasing at specific, different wavelengths. For use with Ho-doped gain fiber, the wavelengths of interest here include 1940 nm (as discussed above), as well as 1880 nm. Thus, Tm-doped fiber laser 25 may be configured to be essentially the same as Tm-doped fiber laser 24 and provide pump light at the wavelength of 1940 nm. For the sake of illustration, that result is shown as providing a first pump beam $L_{P1}$ operating at a wavelength $\lambda_{P1}=1940$ nm. In contrast, the filtering wavelength of the FBGs within Tm-doped fiber laser 27 are formed so that this element provides a second pump beam $L_{P2}$, operating a second pump wavelength of $\lambda_{P2}=1880$ nm. The ability to provide different pump wavelengths to separate amplifier stages without requiring separate laser diode sources is considered to be advantageous in size, expense, and flexibility of operation of the inventive HDFA as shown in FIG. 16.

Figure 17:
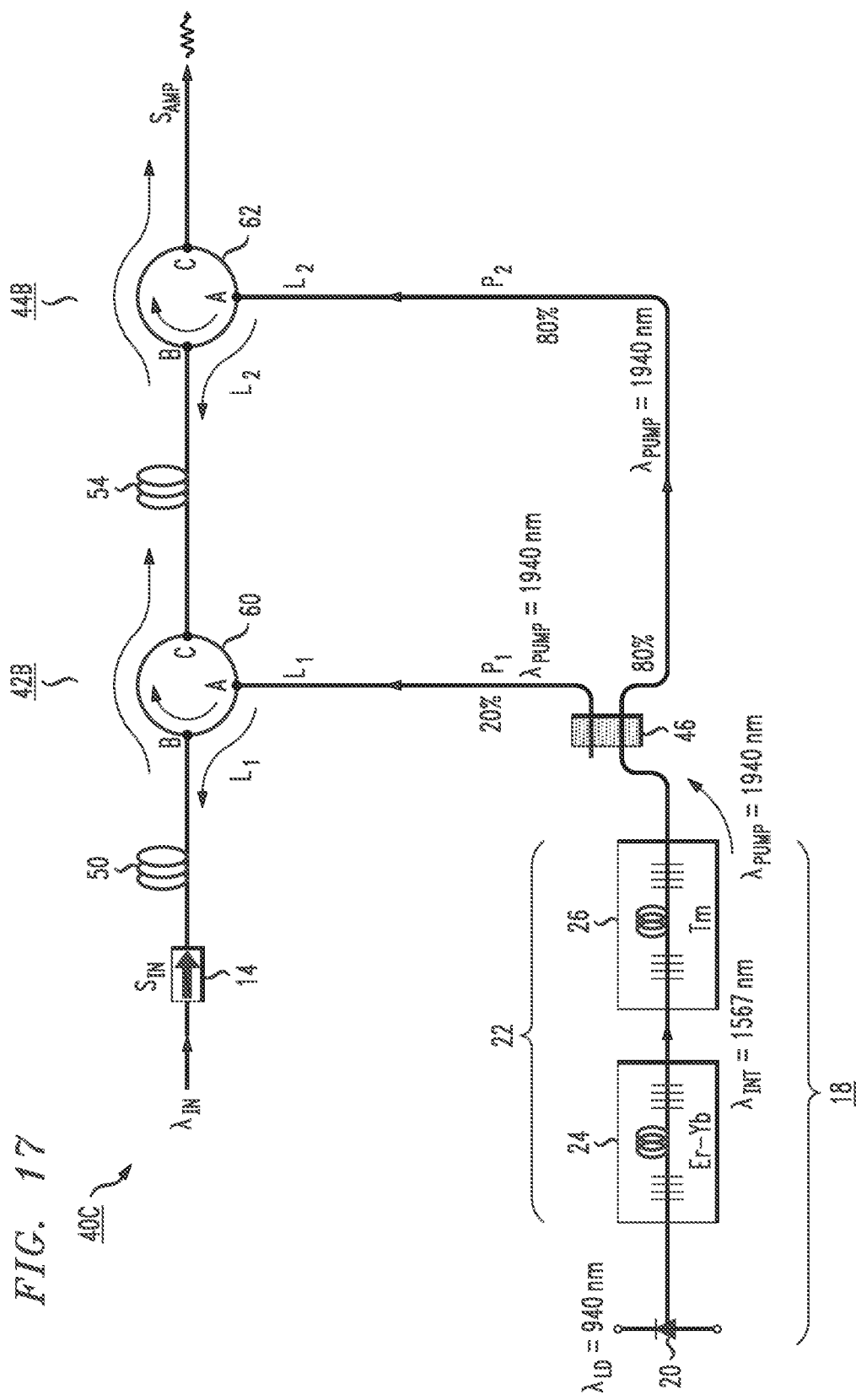
FIG. 17 shows an exemplary multi-stage HDFA that is configured to utilize an optical circulator (in placed of a WDM) in conjunction with a counter-propagating pump light.

Similar to the single-stage counter-pumped HDFA embodiments described above, a multi-stage HDFA of the present invention that includes at least one counter-pumped amplifying stage may be formed to utilize optical circulators instead of a combination of WDMs and optical isolators. FIG. 17 illustrates one such multi-stage HDFA 40C, where both a first HDFA stage 42B and a second HDFA stage 44B are configured as counter-propagating amplifiers. Pump source 18 is shown in FIG. 17 as being the same as that used to support multi-stage HDFA 40 of FIG. 14, with power splitter 46 again dividing the amount of pump power delivered to each amplifier stage.

In accordance with this embodiment of the present invention, multi-stage HDFA 40C is considered to be relatively compact, eliminating the need for both inter-stage isolator 40 and output isolator 19. Additionally, the use of WDMs is replaced by optical circulators, with a first optical circulator 60 forming part of first amplifying stage 42B and a second optical circulator 62 included within second amplifying stage 44B. As with optical circulator 32 described above, optical circulators 60, 62 are defined as including a "pump input" port A, a "pump output"/"amplified signal input" port B, and an "amplified signal output" port C. First pump beam $L^1$ is shown as entering port A of optical circulator 60, and thereafter exiting at port B to propagate through Ho-doped gain fiber 50 of first amplifier stage 42B. Input signal $S_{IN}$, interacting with this counter-propagating pump light, creates first amplified signal $S_{A1}$, which is shown as provided as an input to port B of optical circulator 60. Amplified signal $S_{A1}$ thereafter exits optical circulator 60 at port C, which is coupled to Ho-doped gain fiber 54 of second amplifier stage 44B (it is to be noted that there is no need to include an optical isolator between stages by virtue of using unidirectional optical circulators).

The second pump beam $L_2$ created by pump source 18 is shown as coupled into port A of second optical circulator 62, where it is thereafter directed out of port B so as to propagate through Ho-doped fiber 54 and interact with amplified signal SA1 to create the output amplified signal $S_{AMP}$. In accordance with this embodiment of the present invention, the amplified signal $S_{AMP}$ exiting Ho-doped fiber 54 is coupled into port B of second optical circulator 62, and travels through circulator 62 to exit at port C, defined as the output of multi-stage HDFA 40C.

Figure 18:
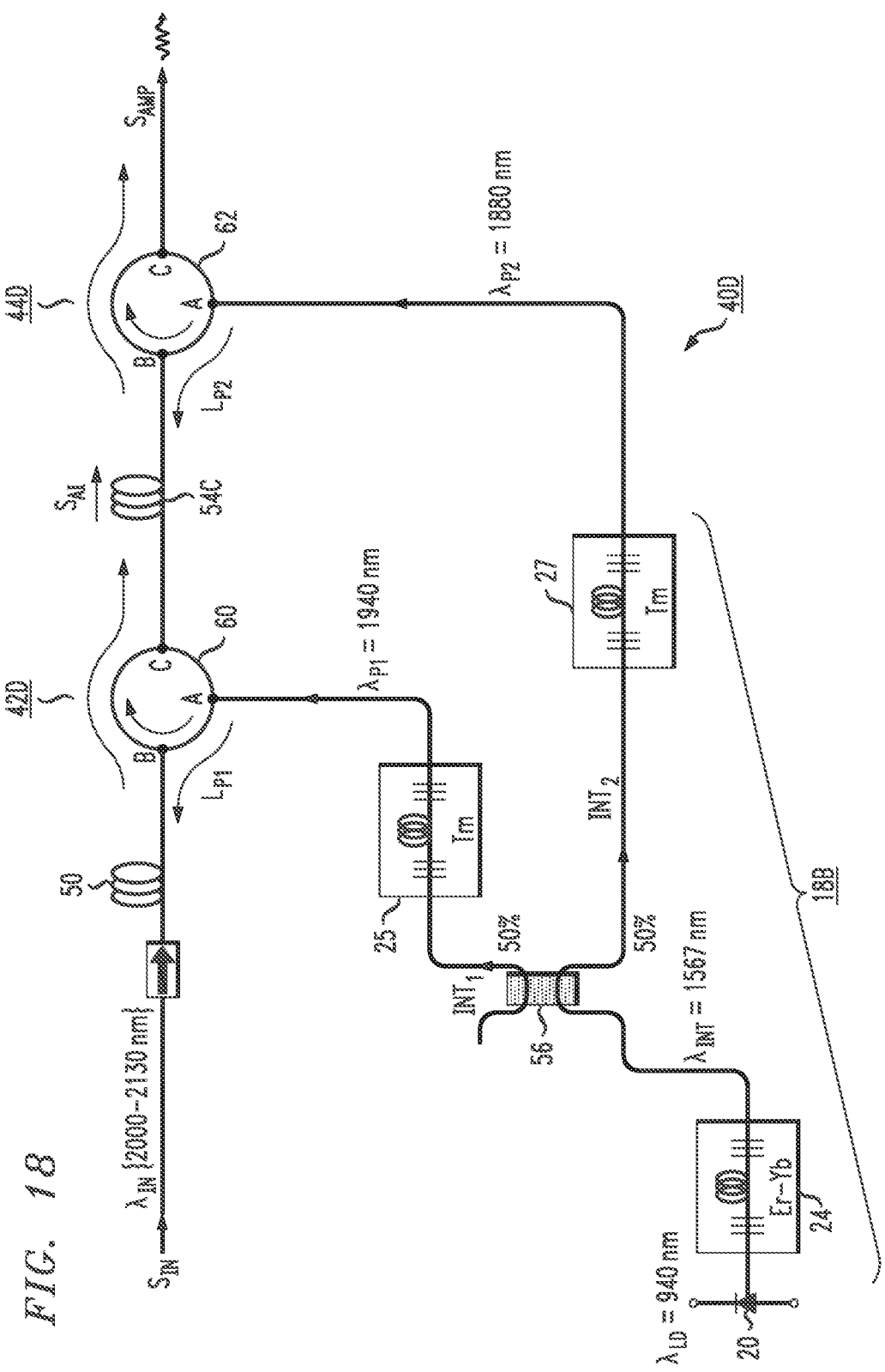
FIG. 18 illustrates another arrangement of a multi-stage HDFA, in this case providing pump light at two different wavelengths (as in the arrangement of FIG. 16), with optical circulators (as shown in FIG. 17) used to introduce each pump beam into its associated amplifying stage.

FIG. 18 illustrates yet another configuration of a multi-stage HDFA of the present invention, in this case denoted as multi-stage HDFA 40D and configured to use a pair of counter-pumped amplifier stages 42D, 44D that utilize optical circulators 60 and 62, respectively. Additionally, the arrangement as shown in FIG. 18 utilizes the modified pump source 18B as discussed above in association with FIG. 15 to supply pump beams operating at different wavelengths to each amplifier stage. Multi-stage HDFA 40D of FIG. 18 thus provides the benefits associated with using different pump wavelengths to optimize the performance of each amplifier stage and providing a relatively compact, reduced component count amplifier assembly.

Figure 19:
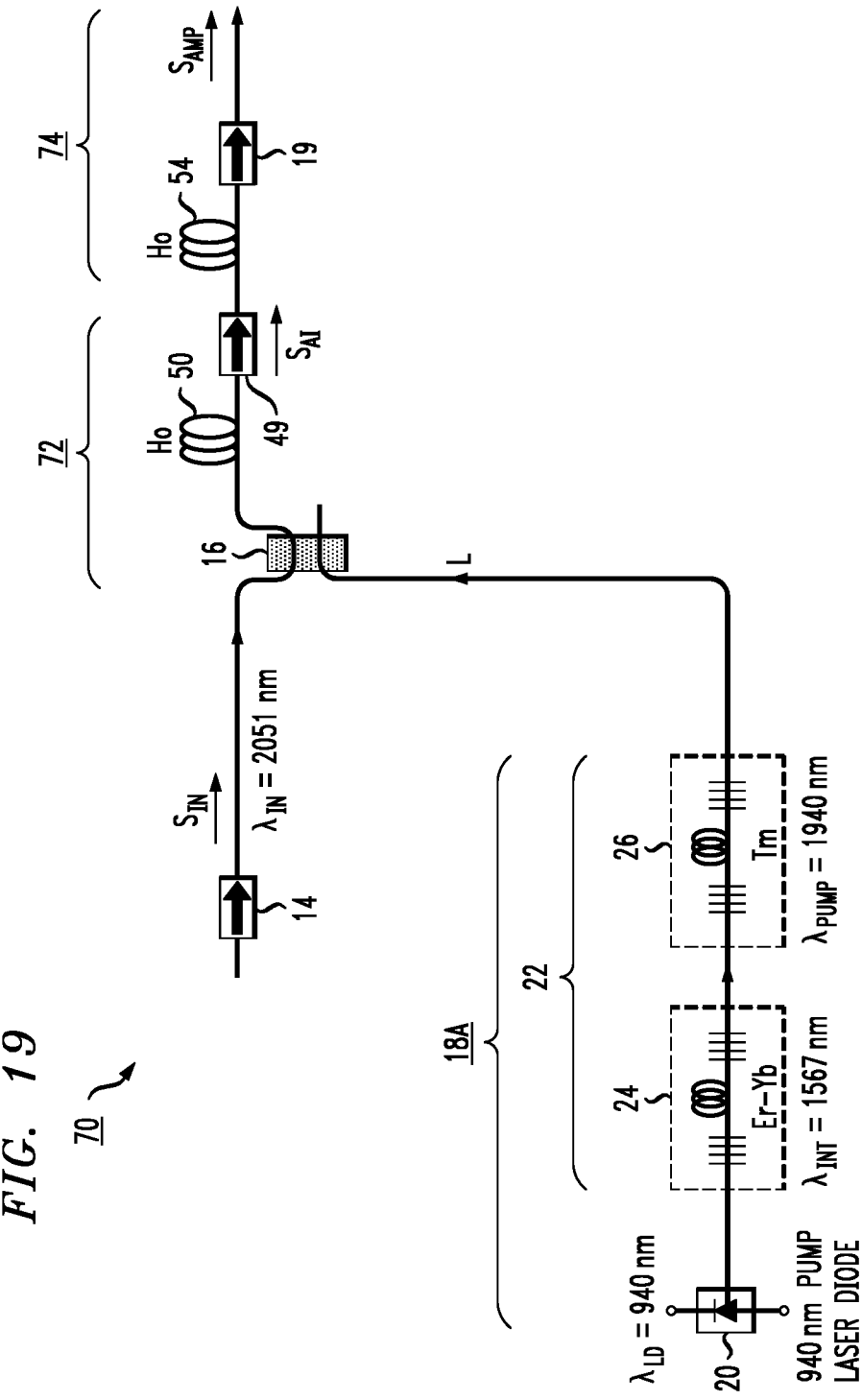
FIG. 19 illustrates yet another embodiment of the multi-stage configuration of FIG. 14, where in this case the pump input is applied only to an input stage of a multi-stage HDFA, with a following stage providing amplification based upon the residual pump beam remaining in the output from the input stage.

An even more compact configuration of a multi-stage HDFA is shown in FIG. 19. In this case, an exemplary HDFA 70 is formed to include an input HDFA stage 72 and an output HDFA stage 74. In contrast to the arrangements described above, a pump source 18A is only coupled to input HDFA stage 72. Similar to the configuration of FIG. 1, pump light L (operating at a suitable pump wavelength $\lambda_{PUMP}$) is provided at the pump input port of WDM 16, with input signal $S_{IN}$ passing through isolator 14 and coupled to the signal input port of WDM 16. Thus, similar to the configuration of FIG. 1, the combination of these components provides a first amplified output signal $S_{A1}$.

In this case, and in contrast to the multi-stage configurations of FIGS. 14-18, there is no additional pump light applied as a separate input to Ho-doped gain fiber 54 of output HDFA stage 74. Instead, the residual pump power remaining in the light exiting input HDFA stage 72 (see, for example, the residual pump power shown in the plot of FIG. 5) is used to impart additional gain to the amplified version of the propagating signal. It is to be understood that the power level of the original pump light, as well as the Ho dopant concentrations in stages 72, 74 may all be designed such that sufficient residual pump power remains to provide additional amplification. Thus, a multi-stage amplifier may be formed that does not require a separate WDM for introducing pump light to each stage, resulting in a more compact assembly.

Figure 20:
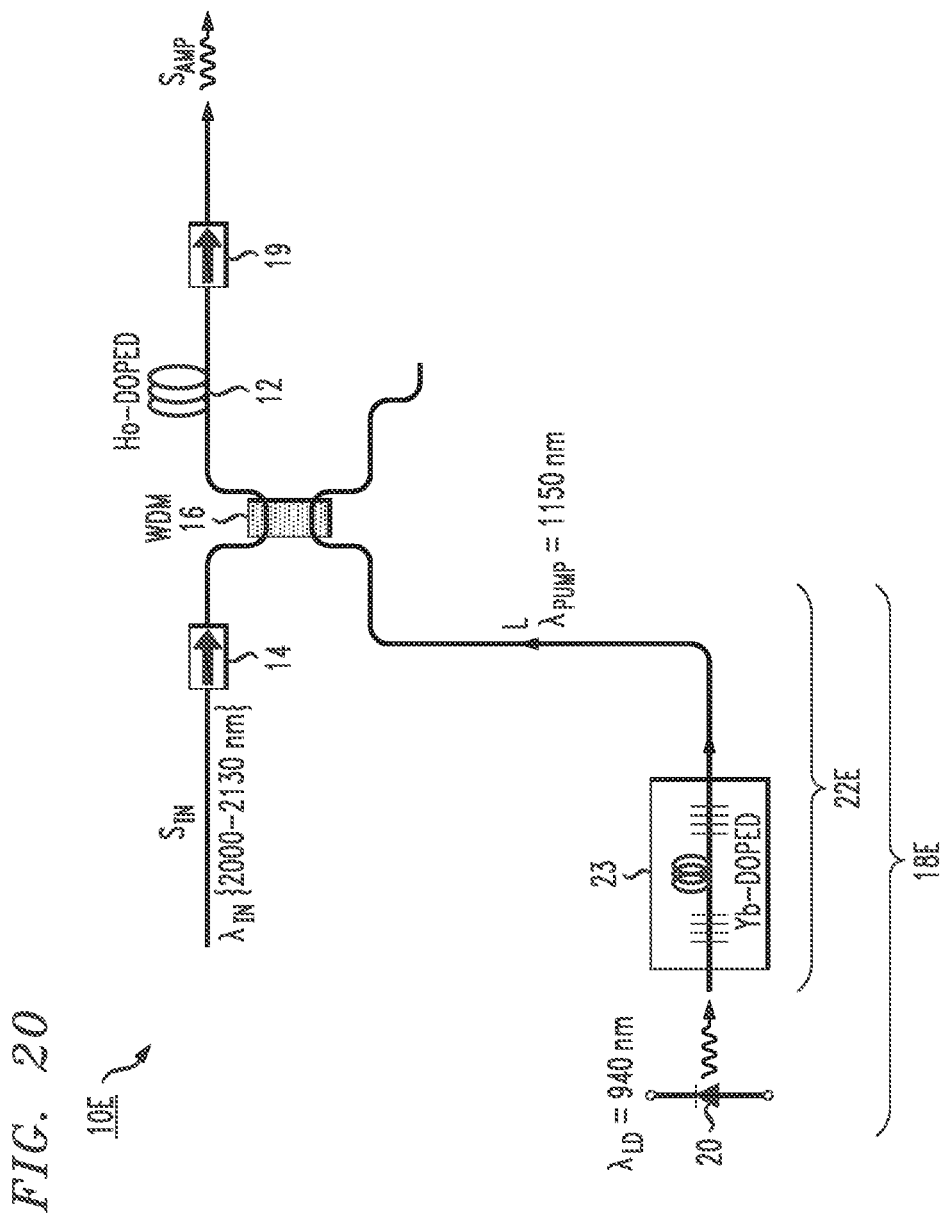
FIG. 20 is a block diagram of another embodiment of the present invention, where in this case a single-stage fiber laser (based upon a Yb-doped gain fiber) is used to provide a pump beam operating at a wavelength that interacts with Ho ions within the gain fiber (for a Yb-doped fiber, a pump wavelength of 1150 nm.

FIG. 20 illustrates yet another HDFA formed in accordance with the teachings of the present invention. Denoted as HDFA 10E, this embodiment utilizes a fiber laser component 22E that is based upon a single fiber laser. In particular, a Yb-doped fiber laser 23 is used in conjunction with laser diode 20 to provide a pump output L at a wavelength $\lambda_{PUMP}$ of about 1150 nm. This is another wavelength able to interact with the Ho ions within single-clade gain fiber 12 and generate amplification in the propagating optical signal $S_{IN}$. While not explicitly shown, it is to be understood that a counter-propagating version of the embodiment of FIG. 18 may be formed, as well as a multi-stage arrangement using pump source 18B as shown in FIG. 16. It should also be understood that in some embodiments pump source may comprise only a laser diode source, operating at a suitable wavelength, without the need for fiber lasers to be included in the signal path.

In yet another application, the inventive HDFA may be used to generate an ASE optical beam. There are applications where there is a need to provide a broadband "noise" signal with a relatively high level of optical power (for example, as an input seed source for fiber optic gyroscopes).

Figure 21:
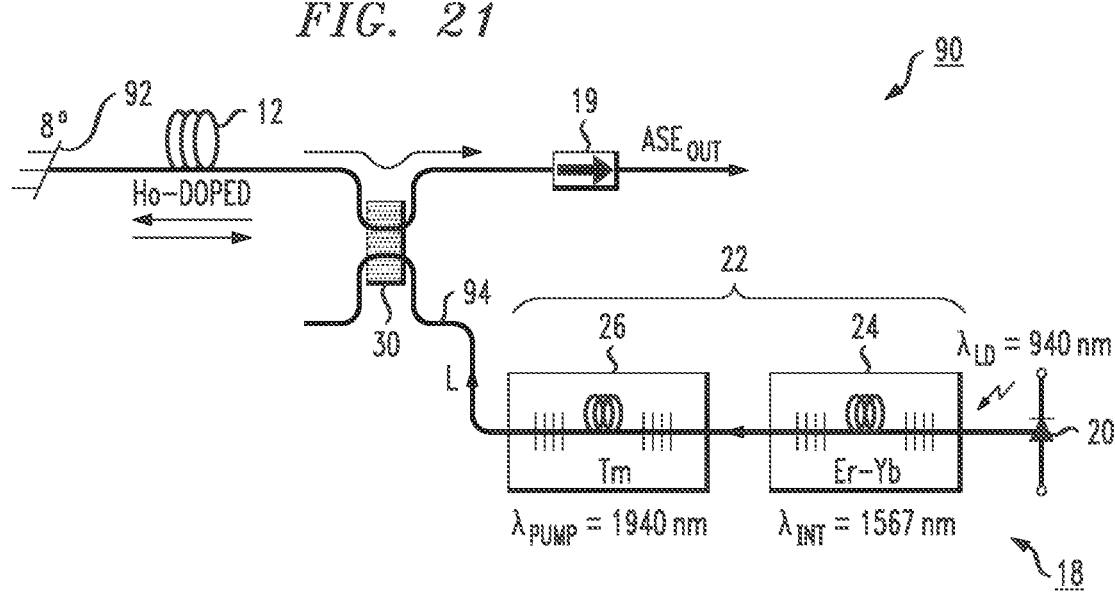
FIG. 21 contains a block diagram of yet another embodiment of the present invention, in this case using the single-clad Ho-doped gain fiber in combination with the pump source to generate a broadband ASE output within the eye-safe wavelength region.

FIG. 21 illustrates an exemplary ASE source 90 formed in accordance with the present invention to provide this broadband ASE output. In contrast to the arrangements described above that are specifically directed to the amplification of an applied input signal, ASE source 90 provides a broadband continuum output associated with the propagation of pump light through the gain fiber.

Figure 22:
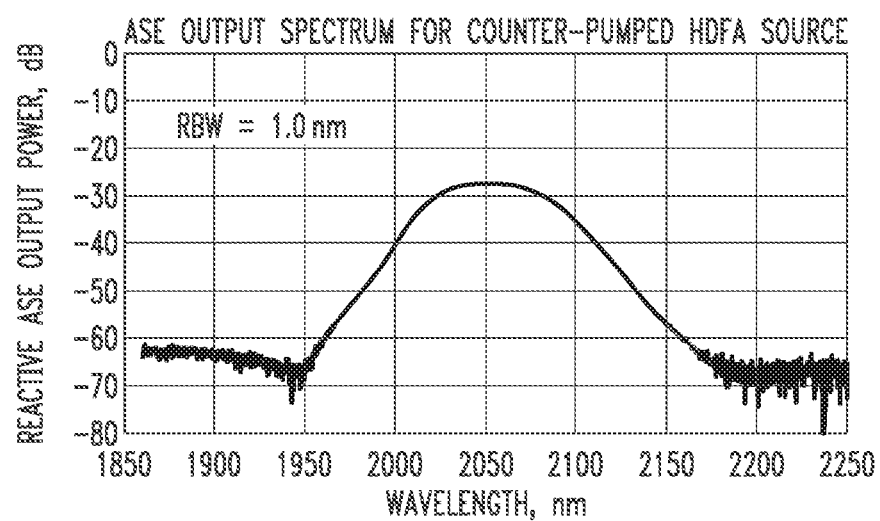
FIG. 22 is a plot of the broadband ASE output provided by the configuration of FIG. 14.

As shown in FIG. 21, pump light L is the only optical energy coupled into the Ho-doped core region 1 of single-clad gain fiber 12. The specific embodiment shown in FIG. 21 is a counter-propagating arrangement, with pump light L entering at the output of single-clad gain fiber 12. The pump light propagates in the reverse direction along gain fiber 12, is reflected off of a termination at the input endface of gain fiber 12 (such as, for example, a beveled termination 92 of gain fiber 12), and then travels in the forward direction through gain fiber 12. By passing through gain fiber 12 twice, the pump light is further able to experience interactions with the Ho ions, so as to broaden the ASE spectral output and increase the amount of output power present in the output. While not rising to the amplified level of an input signal, this pump light is also sufficiently amplified (as evident from the spectral response illustrated in FIG. 5), providing the relatively broadband ASE output as shown in FIG. 22.

Inasmuch as only pump light L is coupled into gain fiber 12, WDM 30 may be eliminated, with an output fiber 94 from pump source 18 directly spliced to gain fiber 12. However, it is possible that this direct coupling may introduce strong reflections (associated with the peak of the ASE output) back into pump source 18. These reflections are known to degrade the quality of the pump beam and may therefore ultimately degrade the ASE output itself. Thus, the inclusion of WDM 30 functions as a "filter" element in this embodiment to prevent reflections from re-entering pump source 18.

Figure 23:
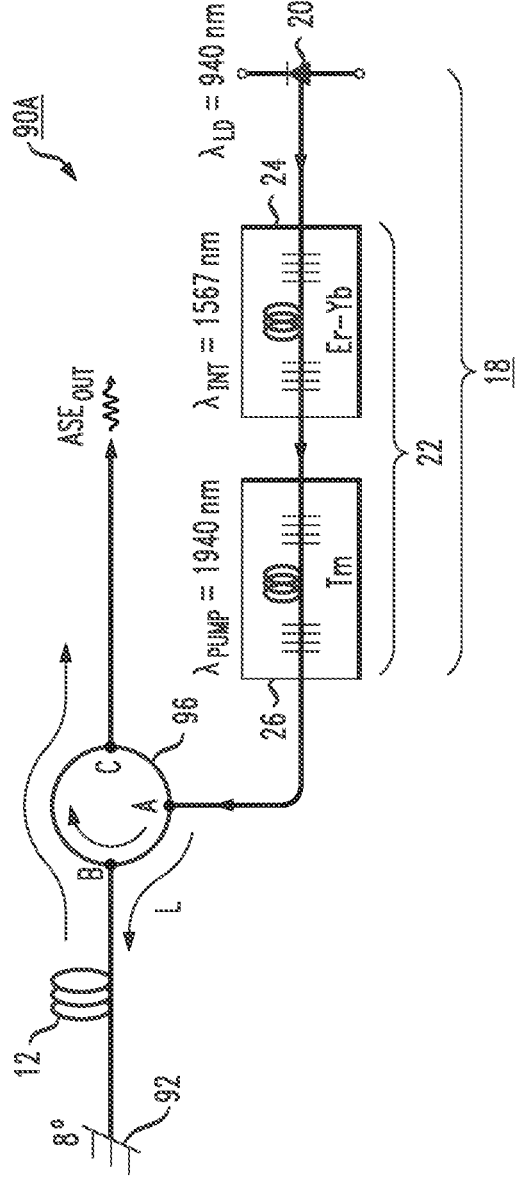
FIG. 23 illustrates an alternative configuration of an ASE broadband source, in this case using an optical circulator in place of a WDM to introduced the pump light to the Ho-doped gain fiber.

FIG. 23 illustrates an alternative embodiment of an ASE source formed in accordance with the principles of the present invention. In particular, ASE source 90A is based upon the use of an optical circulator 96 in combination with Ho-doped single clad gain fiber 12. Similar to the arrangements using optical circulators as described above, pump light at an appropriate wavelength is provided by pump source 18 and applied as an input to port A of optical circulator 92. The pump light exits optical circulator at port B and is introduced into the output of gain fiber 12, propagating in the counter direction along the fiber. The pump light will be reflected at element 92, pass again through gain fiber 12 (where it receives additional spectral broadening and amplification), and then be injected into port B of optical circulator 96. Again, the ASE generated by gain fiber 12 will travel through optical circulator 96 and ultimately exit the device at port C.

While the various embodiments of the present invention as described above utilized a pump source based upon the combination of a discrete laser diode and fiber laser component, the individual fiber lasers utilized within the fiber laser component have remained conventional in form; that is, a section of rare-earth doped fiber bounded by a pair of fiber Bragg gratings (FBGs) designed to provide at an output pump beam at a useable wavelength.

Figure 24:
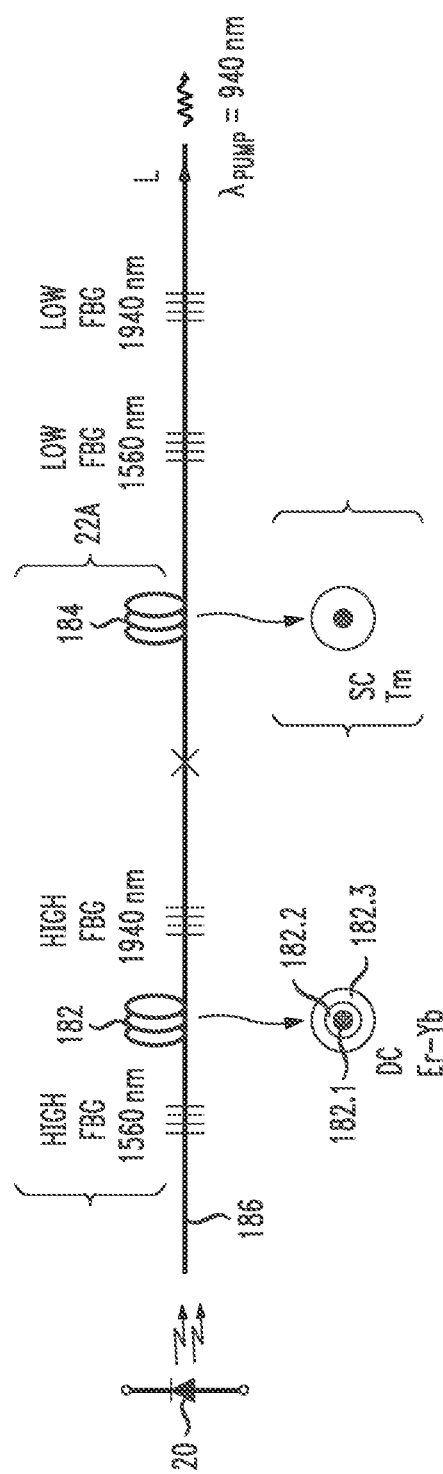
FIG. 24 depicts an alternative pump source arrangement, based upon a fiber laser arrangement using a pair of gain fibers disposed between FBGs of the requisite high and low reflectivity.

FIG. 24 illustrates an alternative fiber laser component 22A that may be used in conjunction with laser diode 20 to form a different type of pump source 180. Similar to the some of the embodiments described above, fiber laser component 22A includes a section of Er—Yb co-doped gain fiber 182 and a section of Tm-doped gain fiber 184. In this case, however, Er—Yb co-doped gain fiber 182 comprises a section of double-clad optical fiber 186, which is able to receive as an input a multimode optical wave output from laser diode 20. The light from laser diode 20 interacts with the Er and Yb ions within both the core 182.1 and inner cladding layer 182.2 of co-doped gain fiber 182, allowing for a relatively high power output (at the intermediate wavelength of $\lambda_{INT}$ of about 1560 nm) to be generated. A first high reflectivity FBG 188 (centered on the intermediate pump wavelength) is formed at the input to Er—Yb co-doped gain fiber 182, as shown in FIG. 24. Formed along an output section of double-clad optical fiber 186 is a second high reflectivity FBG 190, which in this case is entered on a conventional pump wavelength of 1940 nm.

An output endface termination of double-clad optical fiber 186 is shown in FIG. 24 as spliced to an input endface termination of a single-clad optical fiber 192, used to form Tm-doped gain region 194. In accordance with this embodiment of the present invention, a pair of low reflectivity FBGS 196, 198 are formed in single-clad fiber 192 beyond the output of Tm-doped gain region 194. A first low reflectivity FBG 196 is centered on the intermediate wavelength of 1560 nm, and thus forms the boundary of the laser cavity associated with Er—Yb co-doped gain fiber 182. A second low reflectivity FBG 198 is centered on the pump wavelength (e.g., 1940 nm) and thus forms the cavity boundary (as well as output terminal) for the fiber laser defined by Tm-doped gain fiber 194.

Figure 25:
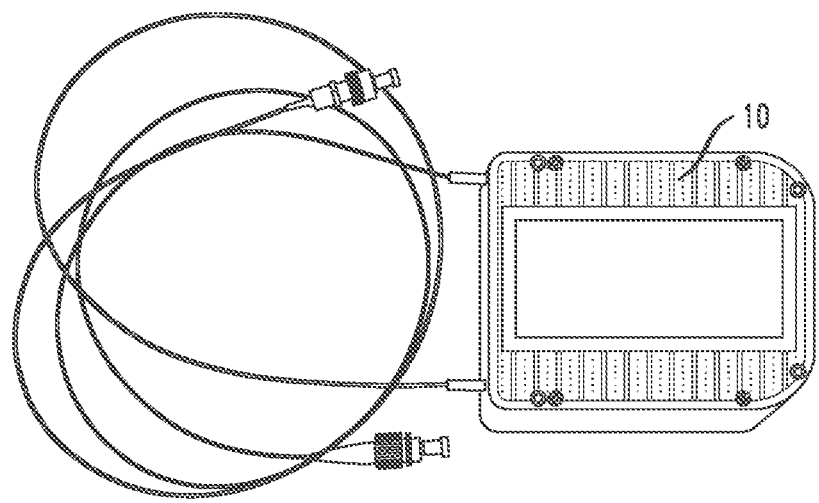
FIG. 25 is a photograph of an exemplary packaged version of an HDFA formed in accordance with the present invention.

Summarizing, it has been found possible to maintain the overall size of the inventive broadband HDFA within a relatively small footprint. Besides the ability to use single-clad Ho-doped gain fiber, as discussed above, a miniaturized isolator/WDM combination may be used as elements 14, 16 to further control the overall size of the amplifier. Indeed, a fully assembled and packaged HDFA formed in accordance with the present invention has been made to have the dimensions of 97×78×15 mm³, where this fully assembled structure incorporates full pump control electronics and an RS232 interface for communication purposes. FIG. 25 is a photograph of an exemplary "packaged" compact inventive HDFA constructed in this manner (specifically, a counter-pumped HDFA), with a business card placed on the top of the package for the purposes of physical size (footprint) comparison.

While certain preferred embodiments of the present invention have been illustrated and described in detail, it should be apparent that modifications and adaptations to these embodiments may occur to one skilled in the art without departing from the scope of the present invention as set forth in the claims appended hereto. Indeed, the described embodiments are to be considered in all respects as only illustrative and not restrictive.

What is claimed is:

1. An optical amplifier for operation at an eye-safe input signal wavelength $\lambda_S$ within the 2 μm region, comprising:
    a section of single-clad optical gain fiber, including a Holmium (Ho)-doped core region, where an input signal is coupled into an input endface of the Ho-doped core region of the single-clad optical gain fiber so as to propagate therealong and exit at an output endface thereof; and
    a low power pump source configured to provide pump light at a defined pump wavelength $\lambda_{PUMP}$ with an output power no greater than about 1 W, the low power pump source comprising
        a discrete laser diode operating at an input wavelength $\lambda_{LD}$; and
        a fiber laser coupled to the discrete laser diode, the fiber laser including a section of rare-earth doped gain fiber disposed between a pair of wavelength-specific optical filters, the fiber laser providing as an output the pump light at the defined wavelength $\lambda_{PUMP}$, the provided pump light coupled into the Ho-doped core region of the single-clad optical gain fiber so as to interact with the propagating input signal and create an increase in optical power of the propagating input signal as it exits the single-clad optical gain fiber.

2. The optical amplifier as defined in claim 1 wherein the pump light is coupled into the input endface of the Ho-doped core region with the input signal, forming a co-propagating optical amplifier.

3. The optical amplifier as defined in claim 2 wherein the optical amplifier further comprises a wavelength division multiplexer (WDM) disposed at the input to the section of single-clad optical gain fiber, with the input signal and the pump light applied as separate inputs to the WDM and combined therein onto a single output path from the WDM, where the output from the WDM is coupled to the Ho-doped core region of the single-clad optical gain fiber.

4. The optical amplifier as defined in claim 1 wherein the pump light is coupled into the output endface of the Ho-doped core region, forming a counter-propagating optical amplifier with respect to the direction of propagation of the input signal.

5. The optical amplifier as defined in claim 4 wherein a wavelength division multiplexer (WDM) is disposed at the output of the section of single-clad optical gain fiber and the pump light is applied as an input to the WDM and directed as a first output from the WDM into the output endface of the Ho-doped core region of the single-clad optical gain fiber.

6. The optical amplifier as defined in claim 4 wherein an optical circulator is coupled at a first port to the output of the section of single-clad optical gain fiber and the pump light is applied as an input to a second port of the optical circulator and directed to exit the optical circulator at the first port, thereby coupled into the section of single-clad optical gain fiber so as to propagate therealong in a direction counter to the applied input signal.

7. The optical amplifier as defined in claim 1 wherein the fiber laser of the low power pump source comprises a dual-stage fiber laser including
    an input stage fiber laser responsive to the output from the discrete laser diode to create a laser output at an intermediate wavelength $\lambda_{INT}$; and
    an output stage fiber laser responsive to the output from the input stage, and generating therefrom a pump light output at the defined pump wavelength $\lambda_{PUMP}$.

8. The optical amplifier as defined in claim 7 wherein the input stage fiber laser comprises an Er—Yb co-doped fiber laser and the output stage fiber laser comprises a Tm-doped fiber laser.

9. The optical amplifier as defined in claim 8 wherein the laser diode source emits at a wavelength of about 940 nm, the Er—Yb co-doped fiber laser converts this to an output at an intermediate wavelength of about 1567 nm, and the Tm-doped fiber laser converts the intermediate wavelength to a pump laser output operating at a wavelength of about 1940 nm.

10. The optical amplifier as defined in claim 1 wherein the optical amplifier further comprises
    a fiber Bragg grating (FBG) disposed the output of the section of Ho-doped gain fiber, the FBG configured to reflect residual pump light and block its continued propagation to the output of the optical amplifier.

11. The optical amplifier as defined in claim 1 wherein the input signal comprises a CW signal, operating at a single frequency.

12. The optical amplifier as defined in claim 1 wherein the input signal comprises a pulsed optical signal.

13. An optical system for providing amplified spontaneous emission in an eye-safe wavelength band, comprising:
  a section of single-clad optical gain fiber, including a Ho-doped core region; and
  a pump source including a laser diode source and a fiber laser coupled to the laser diode source, the fiber laser creating pump light at a defined pump wavelength $\lambda_{PUMP}$ as a pump output of the pump source, the pump output coupled into the Ho-doped core region of the single-clad optical gain fiber so as to interact with Ho ions, generating as an output amplified spontaneous emission centered at a wavelength within the eye-safe wavelength band.

14. A multi-stage optical amplifier for operation at an eye-safe input signal wavelength $\lambda_S$ within the 2 μm region, comprising:
  a plurality of N sections of single-clad Ho-doped optical fiber disposed in a concatenated configuration, each section defining a separate stage of the multi-stage optical amplifier, wherein an input signal is coupled into a first, input stage of the multi-stage optical amplifier;
  a pump source providing pump light at a defined pump wavelength $\lambda_{PUMP}$ that provides optical gain in the presence of Ho ions, the pump source including a laser diode source and a fiber laser coupled to the laser diode source, wherein defined parameters of the fiber laser are configured to provide a pump output at the defined pump wavelength $\lambda_{PUMP}$; and
  a 1:N power splitter coupled between an output of the pump source and a pump light input of each stage of the multi-stage amplifier so as to provide a separate pump beam for propagating through each section of single-clad Ho-doped optical fiber of the plurality of N sections of single-clad Ho-doped optical fiber, each pump beam interacting with the propagating input signal and creating an increase in optical power of the propagating input signal as it passes through each stage of the multi-stage optical amplifier.

15. The multi-stage optical amplifier as defined in claim 14 wherein the 1:N power splitter is configured to provide different fractions of pump power to each stage of the multi-stage optical amplifier.

16. The multi-stage optical amplifier as defined in claim 14 wherein the 1:N power splitter is configured to provide co-propagating pump inputs to each stage of the multi-stage optical amplifier.

17. The multi-stage optical amplifier as defined in claim 14 wherein the 1:N power splitter is configured to provide counter-propagating pump inputs to each stage of the multi-stage optical amplifier.

18. The multi-stage optical amplifier as defined in claim 14 wherein the 1:N power splitter is configured to provide at least one co-propagating pump input to a stage of the multi-stage optical amplifier and provide at least one counter-propagating pump input to a different stage of the multi-stage optical amplifier.

19. A multi-stage optical amplifier for operation at an eye-safe input signal wavelength $\lambda_S$ within the 2 μm region, comprising:
  a plurality of N sections of single-clad Ho-doped optical fiber disposed in a concatenated configuration, each section defining a separate stage of the multi-stage optical amplifier, wherein an input signal is coupled into a first, input stage of the multi-stage optical amplifier;
  a pump source providing pump light at a defined pump wavelength $\lambda_{PUMP}$ that provides optical gain in the presence of Ho ions, the pump source including a laser diode source and a fiber laser coupled to the laser diode source, wherein defined parameters of the fiber laser are configured to provide a pump output at the defined pump wavelength $\lambda_{PUMP}$, where the pump output from the pump source is provided as an input to a first amplifying stage of the multi-stage optical amplifier, with residual pump light present at the output of the first amplifying stage used as a pump light input to a following amplifying stage.

* * * * *